US006583255B1

(12) United States Patent
Lubowitz et al.

(10) Patent No.: US 6,583,255 B1
(45) Date of Patent: Jun. 24, 2003

(54) POLYESTER OLIGOMER

(75) Inventors: Hyman R. Lubowitz, Rolling Hills Estates, CA (US); Clyde H. Sheppard, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 08/463,437

(22) Filed: Jun. 5, 1995

Related U.S. Application Data

(60) Division of application No. 07/137,493, filed on Dec. 23, 1987, now Pat. No. 5,705,598, which is a continuation-in-part of application No. 06/726,259, filed on Apr. 23, 1985, now abandoned.

(51) Int. Cl.[7] ............... C08G 63/02; C08G 63/688; C08G 75/20
(52) U.S. Cl. ............. 528/171; 252/183.11; 528/170; 528/173; 528/193; 528/288; 528/289
(58) Field of Search ............ 252/183.11; 528/170, 528/171, 173, 193, 288, 289

(56) References Cited

U.S. PATENT DOCUMENTS

| | | | | |
|---|---|---|---|---|
| 3,105,839 | A | 10/1963 | Renner | |
| 3,236,705 | A | 2/1966 | Gilman et al. | |
| 3,236,808 | A | 2/1966 | Goldberg et al. | 528/175 |
| 3,262,914 | A | 7/1966 | Goldberg et al. | |
| 3,265,708 | A | 8/1966 | Stiteler | |
| 3,267,081 | A | 8/1966 | Rudner et al. | |
| 3,313,783 | A | 4/1967 | Iwakura et al. | |
| 3,354,129 | A | 11/1967 | Edmonds et al. | |
| 3,355,272 | A | 11/1967 | D'Alessandro | |
| 3,386,969 | A | 6/1968 | Levine | |
| 3,408,349 | A | 10/1968 | Matsunaga | |
| 3,431,235 | A | 3/1969 | Lubowitz | |
| 3,435,003 | A | 3/1969 | Craven | |
| 3,448,084 | A | 6/1969 | Burdick et al. | 528/289 X |
| 3,449,442 | A | 6/1969 | Williams et al. | |
| 3,449,467 | A | 6/1969 | Wynstra | 528/289 X |
| 3,450,711 | A | 6/1969 | Megna et al. | |
| 3,453,236 | A | 7/1969 | Culbertson | 528/128 |
| 3,454,673 | A | 7/1969 | Schmidt | 525/445 |
| 3,458,486 | A | 7/1969 | Ray et al. | |
| 3,461,461 | A | 8/1969 | Anthony et al. | |
| 3,528,950 | A | 9/1970 | Lubowitz | |
| 3,530,087 | A | 9/1970 | Hayes et al. | |
| 3,536,270 | A | 10/1970 | Aeiony et al. | |
| 3,562,223 | A | 2/1971 | Bargain et al. | |
| 3,563,951 | A | 2/1971 | Dormagen et al. | |
| 3,565,549 | A | 2/1971 | Lubowitz et al. | |
| 3,592,841 | A | 7/1971 | Broadhead | |
| 3,598,768 | A | 8/1971 | Bach | |
| 3,609,181 | A | 9/1971 | Lubowitz et al. | |
| 3,616,193 | A | 10/1971 | Lubowitz et al. | |
| 3,624,042 | A | 11/1971 | Lubowitz et al. | |
| 3,631,222 | A | 12/1971 | Vogel | 525/419 |
| 3,632,428 | A | 1/1972 | Lubowitz et al. | |
| 3,635,891 | A | 1/1972 | Lubowitz et al. | |
| 3,641,207 | A | 2/1972 | Lauchlan | |
| 3,647,529 | A | 3/1972 | Lubowitz et al. | |
| 3,652,710 | A | 3/1972 | Holub | |
| 3,658,764 | A | 4/1972 | Bargain et al. | |
| 3,658,938 | A | 4/1972 | Kwiatkowski et al. | 525/436 |
| 3,663,507 | A | 5/1972 | Vogel | 528/173 |
| 3,689,464 | A | 9/1972 | Holub et al. | |
| 3,697,308 | A | 10/1972 | Lubowitz et al. | |
| 3,697,345 | A | 10/1972 | Lubowitz et al. | |
| 3,699,074 | A | 10/1972 | Lubowitz et al. | |
| 3,699,075 | A | 10/1972 | Lubowitz | 528/172 |
| 3,708,370 | A | 1/1973 | Lubowitz et al. | |
| 3,708,439 | A | 1/1973 | Sayigh et al. | 528/186 |
| 3,708,459 | A | 1/1973 | Lubowitz | |
| 3,729,446 | A | 4/1973 | Holub et al. | |
| 3,745,149 | A | 7/1973 | Serafini et al. | |
| 3,748,311 | A | 7/1973 | Burns et al. | |
| 3,748,312 | A | 7/1973 | Burns et al. | |
| 3,749,735 | A | 7/1973 | Loria | |
| 3,757,088 | A | 9/1973 | Osborn | |
| 3,759,777 | A | 9/1973 | Lubowitz et al. | |

(List continued on next page.)

FOREIGN PATENT DOCUMENTS

| | | |
|---|---|---|
| CA | 1175998 | 9/1984 |
| CA | 1269576 | 5/1990 |
| DE | 1951632 | 5/1971 |
| EP | 0152372 | 1/1985 |
| EP | 0175484 | 3/1986 |
| EP | 0067976 | 3/1987 |
| EP | 0283636 | 1/1988 |

(List continued on next page.)

OTHER PUBLICATIONS

St. Clair, et al., *Additives Lower Pickup of Moisture by Polyimides* NASA Tech Briefs, 80–81, Apr., 1989.
Heidemann, "Oligomers" Encyclopedia of Polymer Science and Technology vol. 9 Molding to Petroleum Resins 485–506, 1968.
*Second–generation polyimide raises continuous–use temperatures* Advanced Composites, May/Jun. 1988.
Vanucci et al., *700° F. Properties of Autoclave Cured PMR–II Composites* NASA Tech. Memo 100923. Sep., 1988.
Vanucci, *PMR Polyimide Compositions for Improved Peformance at 371° C.* NTIS N87–16071, Apr., 1987.

(List continued on next page.)

*Primary Examiner*—Richard D. Lovering
(74) *Attorney, Agent, or Firm*—John C. Hammar

(57) ABSTRACT

High performance polyester sulfone oligomers are prepared for aerospace applications by condensing mono- or difunctional crosslinkable end caps (i.e. unsaturated hydrocarbons having one or two crosslinking sites) with dicarboxylic acid halides and dialcohols (i.e. diols). Multidimensional oligomers have an aromatic hub from which the polyester chains radiate. Blends of the linear and multidimensional oligomers can be made using compatible, non-crosslinking polymers. Prepregs and composites are formed from the oligomers or blends.

42 Claims, No Drawings

U.S. PATENT DOCUMENTS

| | | | |
|---|---|---|---|
| 3,761,441 A | 9/1973 | D'Alessandro et al. | |
| 3,763,101 A | 10/1973 | Jones et al. | |
| 3,770,697 A | 11/1973 | Holub et al. | |
| 3,772,250 A | 11/1973 | Economy et al. | |
| 3,773,718 A | 11/1973 | Klebe et al. | |
| 3,781,240 A | 12/1973 | Lubowitz et al. | |
| 3,781,249 A | 12/1973 | Lubowitz | |
| 3,803,081 A | 4/1974 | Lubowitz | 524/538 |
| 3,812,159 A | 5/1974 | Lubowitz | 549/24 |
| 3,827,927 A | 8/1974 | Lubowitz et al. | |
| 3,839,287 A | 10/1974 | Kwiatkowski et al. | 528/172 |
| 3,843,593 A | 10/1974 | Shell et al. | |
| 3,847,867 A | 11/1974 | Heath et al. | |
| 3,847,869 A | 11/1974 | WIlliams, III | |
| 3,853,815 A | 12/1974 | Lubowitz | |
| 3,859,252 A | 1/1975 | Cho | |
| 3,879,349 A | 4/1975 | Bilkow et al. | |
| 3,879,393 A | 4/1975 | Havera | |
| 3,879,428 A | 4/1975 | Heath et al. | |
| 3,887,582 A | 6/1975 | Holub et al. | |
| 3,890,272 A | 6/1975 | D'Alelio | |
| 3,895,064 A | 7/1975 | Brode et al. | |
| 3,896,147 A | 7/1975 | Stephen | |
| 3,897,395 A | 7/1975 | D'Alelio | |
| 3,909,507 A | 9/1975 | Betts et al. | |
| 3,914,334 A | 10/1975 | Lubowitz et al. | |
| 3,919,177 A | 11/1975 | Campbell | |
| 3,920,768 A | 11/1975 | Kwiatkowski | 524/421 |
| 3,925,324 A | 12/1975 | Gerard | |
| 3,933,862 A | 1/1976 | Williams, III | |
| 3,935,167 A | 1/1976 | Marvel et al. | |
| 3,935,320 A | 1/1976 | Chiu et al. | |
| 3,941,746 A | 3/1976 | Stephen | |
| 3,956,320 A | 5/1976 | Heath et al. | |
| 3,957,732 A | 5/1976 | Hirooka et al. | |
| 3,957,862 A | 5/1976 | Heath et al. | 562/468 |
| 3,966,678 A | 6/1976 | Gruffaz et al. | |
| 3,966,726 A | 6/1976 | Toth et al. | |
| 3,966,987 A | 6/1976 | Suzuki et al. | |
| 3,970,714 A | 7/1976 | Bargain | |
| 3,972,902 A | 8/1976 | Heath et al. | 549/241 |
| 3,988,374 A | 10/1976 | Brode et al. | |
| 3,993,630 A | 11/1976 | Darmory et al. | |
| 3,998,786 A | 12/1976 | D'Alelio | |
| 4,000,146 A | 12/1976 | Gerber | |
| 4,005,134 A | 1/1977 | Markezich | |
| 4,013,600 A | 3/1977 | Cassat | |
| 4,020,069 A | 4/1977 | Johnson et al. | 562/473 |
| 4,026,871 A | 5/1977 | D'Alelio | |
| RE29,316 E | 7/1977 | Bargain et al. | 524/104 |
| 4,038,261 A | 7/1977 | Crouch et al. | |
| 4,051,177 A | 9/1977 | Braden et al. | |
| 4,055,543 A | 10/1977 | D'Alelio | |
| 4,058,505 A | 11/1977 | D'Alelio | |
| 4,060,515 A | 11/1977 | D'Alelio | 528/125 |
| 4,064,289 A | 12/1977 | Yokoyama et al. | 427/82 |
| 4,075,171 A | 2/1978 | D'Alelio | |
| 4,097,456 A | 6/1978 | Barie | 526/75 |
| 4,100,137 A | 7/1978 | Lemieux et al. | 525/154 |
| 4,100,138 A | 7/1978 | Bilow et al. | 526/262 |
| 4,101,488 A | 7/1978 | Ishizuka et al. | 524/592 |
| 4,107,147 A | 8/1978 | Williams, III et al. | |
| 4,107,153 A | 8/1978 | Akiyama et al. | |
| 4,107,174 A | 8/1978 | Baumann et al. | |
| 4,108,837 A | 8/1978 | Johnson et al. | 528/126 |
| 4,108,926 A | 8/1978 | Arnold et al. | 525/534 |
| 4,111,879 A | 9/1978 | Mori et al. | |
| 4,115,231 A | 9/1978 | Darms et al. | 204/159.22 |
| 4,115,362 A | 9/1978 | Inata et al. | |
| 4,116,937 A | 9/1978 | Jones et al. | 528/170 |
| 4,124,593 A | 11/1978 | Gschwend et al. | |
| 4,126,619 A | 11/1978 | Darms et al. | 548/435 |
| 4,128,574 A | 12/1978 | Markezich et al. | 562/473 |
| 4,132,715 A | 1/1979 | Roth | |
| 4,132,716 A | 1/1979 | Kvita et al. | |
| 4,134,895 A | 1/1979 | Roth et al. | |
| 4,142,870 A | 3/1979 | Lovejoy | |
| 4,158,731 A | 6/1979 | Baumann et al. | |
| 4,166,168 A | 8/1979 | D'Alelio | 526/259 |
| 4,167,663 A | 9/1979 | Granzow, Jr. et al. | |
| 4,168,366 A | 9/1979 | D'Alelio | 525/426 |
| 4,172,836 A | 10/1979 | Baumann et al. | |
| 4,174,326 A | 11/1979 | Baumann et al. | |
| 4,175,175 A | 11/1979 | Johnson et al. | 528/125 |
| 4,176,223 A | 11/1979 | Irwin | 528/170 |
| 4,179,551 A | 12/1979 | Jones et al. | 526/262 |
| 4,183,839 A | 1/1980 | Gagliani | 524/78 |
| 4,187,364 A | 2/1980 | Darms et al. | |
| 4,189,560 A | 2/1980 | Roth et al. | 526/259 |
| 4,193,927 A | 3/1980 | Baumann et al. | |
| 4,197,397 A | 4/1980 | D'Alelio | 528/222 |
| 4,200,731 A | 4/1980 | Massey et al. | |
| 4,206,106 A | 6/1980 | Heilman et al. | |
| 4,218,555 A | 8/1980 | Antonoplos et al. | |
| 4,221,895 A | 9/1980 | Woo | |
| 4,225,497 A | 9/1980 | Baudouin et al. | |
| 4,225,498 A | 9/1980 | Baudouin et al. | |
| 4,231,934 A | 11/1980 | Oba et al. | |
| 4,234,712 A | 11/1980 | Keller et al. | |
| 4,237,262 A | 12/1980 | Jones | |
| 4,239,883 A | 12/1980 | Stenzenberger | 528/170 |
| 4,244,853 A | 1/1981 | Serafini et al. | |
| 4,250,096 A | 2/1981 | Kvita et al. | |
| 4,251,418 A | 2/1981 | Chow et al. | 524/104 |
| 4,251,419 A | 2/1981 | Heilman et al. | 524/104 |
| 4,251,420 A | 2/1981 | Antonoplos et al. | |
| 4,255,313 A | 3/1981 | Antonoplos et al. | 524/104 |
| 4,266,047 A | 5/1981 | Jablonski et al. | |
| 4,269,961 A | 5/1981 | Jones et al. | |
| 4,271,079 A | 6/1981 | Maeda et al. | |
| 4,273,916 A | 6/1981 | Jones | 528/117 |
| 4,276,407 A | 6/1981 | Bilow et al. | |
| 4,288,583 A | 9/1981 | Zahir et al. | |
| 4,288,607 A | 9/1981 | Bier et al. | 560/11 |
| 4,289,699 A | 9/1981 | Oba et al. | |
| 4,293,670 A | 10/1981 | Robeson et al. | 525/436 |
| 4,297,472 A | 10/1981 | Heiss | 528/84 |
| 4,297,474 A | 10/1981 | Williams, III et al. | 528/170 |
| 4,298,720 A | 11/1981 | Yamazaki et al. | 526/262 |
| 4,299,750 A | 11/1981 | Antonoplos et al. | 526/285 |
| 4,299,946 A | 11/1981 | Balme et al. | |
| 4,302,575 A | 11/1981 | Takekoshi | |
| 4,323,662 A | 4/1982 | Oba et al. | |
| RE30,922 E | 5/1982 | Heilman et al. | |
| 4,338,222 A | 7/1982 | Limburg et al. | |
| 4,338,225 A | 7/1982 | Sheppard | |
| 4,344,869 A | 8/1982 | Blinne et al. | |
| 4,344,870 A | 8/1982 | Blinne et al. | |
| 4,351,932 A | 9/1982 | Street et al. | |
| 4,358,561 A | 11/1982 | Keske et al. | |
| 4,360,644 A | 11/1982 | Naarmann et al. | |
| 4,365,068 A | 12/1982 | Darms et al. | |
| 4,375,427 A | 3/1983 | Miller et al. | |
| 4,376,710 A | 3/1983 | Gardos et al. | |
| 4,381,363 A | 4/1983 | Reinhart, Jr. | |
| 4,389,504 A | 6/1983 | St. Clair et al. | |
| 4,393,188 A | 7/1983 | Takahashi et al. | |
| 4,395,497 A | 7/1983 | Naarmann et al. | |
| 4,400,613 A | 8/1983 | Popelish | |
| 4,405,770 A | 9/1983 | Schoenberg et al. | |
| 4,407,739 A | 10/1983 | Naarmann et al. | |

| | | | | | |
|---|---|---|---|---|---|
| 4,409,382 A | 10/1983 | Keller | 4,628,079 A | 12/1986 | Zecher et al. |
| 4,410,686 A | 10/1983 | Hefner, Jr. et al. | 4,629,777 A | 12/1986 | Pfeifer |
| 4,414,269 A | 11/1983 | Lubowitz et al. ........... 428/290 | 4,631,337 A | 12/1986 | Tomalia et al. |
| 4,417,039 A | 11/1983 | Reinhardt et al. | H183 H | 1/1987 | Karasz et al. |
| 4,417,044 A | 11/1983 | Parekh | 4,638,027 A | 1/1987 | Mark et al. |
| 4,418,181 A | 11/1983 | Monacelli | 4,640,944 A | 2/1987 | Brooks |
| 4,423,202 A | 12/1983 | Choe | 4,649,080 A | 3/1987 | Fischer et al. |
| 4,429,108 A | 1/1984 | Stephens | 4,654,410 A | 3/1987 | Kashiwame et al. |
| 4,438,273 A | 3/1984 | Landis | 4,657,973 A | 4/1987 | Endo et al. |
| 4,438,280 A | 3/1984 | Monacelli | 4,657,977 A | 4/1987 | Peters |
| 4,446,191 A | 5/1984 | Miyadera et al. | 4,657,987 A | 4/1987 | Rock et al. |
| 4,448,925 A | 5/1984 | Hanson | 4,657,990 A | 4/1987 | Daoust et al. |
| 4,460,783 A | 7/1984 | Nishikawa et al. | 4,660,057 A | 4/1987 | Watanabe et al. |
| 4,465,809 A | 8/1984 | Smith | 4,661,604 A | 4/1987 | Lubowitz et al. |
| 4,467,011 A | 8/1984 | Brooks et al. | 4,663,378 A | 5/1987 | Allen |
| 4,476,184 A | 10/1984 | Lubowitz et al. ........... 428/288 | 4,663,399 A | 5/1987 | Peters |
| 4,476,295 A | 10/1984 | Stephens | 4,663,423 A | 5/1987 | Yamada et al. |
| 4,482,683 A | 11/1984 | Quella et al. | 4,663,424 A | 5/1987 | Stix et al. |
| 4,485,140 A | 11/1984 | Gannett et al. | 4,663,425 A | 5/1987 | Evers et al. |
| 4,485,231 A | 11/1984 | Landis | 4,680,326 A | 7/1987 | Leland et al. |
| 4,489,027 A | 12/1984 | St. Clair et al. | 4,680,377 A | 7/1987 | Matsumura et al. |
| 4,504,620 A | 3/1985 | Cluff et al. ................. 528/289 | 4,684,714 A | 8/1987 | Lubowitz et al. |
| 4,504,632 A | 3/1985 | Holub et al. | 4,690,972 A | 9/1987 | Johnson et al. |
| 4,507,466 A | 3/1985 | Tomalia et al. | 4,691,025 A | 9/1987 | Domeier et al. |
| 4,510,272 A | 4/1985 | Loszewski | 4,694,064 A | 9/1987 | Tomalia et al. |
| 4,515,962 A | 5/1985 | Renner | 4,695,610 A | 9/1987 | Egli et al. |
| 4,519,926 A | 5/1985 | Basalay et al. | 4,699,975 A | 10/1987 | Katto et al. |
| 4,520,198 A | 5/1985 | D'Alelio et al. | 4,703,081 A | 10/1987 | Blackwell et al. |
| 4,526,838 A | 7/1985 | Fujioka et al. | 4,708,983 A | 11/1987 | Liang |
| 4,533,692 A | 8/1985 | Wolfe et al. | 4,709,004 A | 11/1987 | Dai |
| 4,533,693 A | 8/1985 | Wolfe et al. | 4,709,006 A | 11/1987 | Tsai et al. |
| 4,533,724 A | 8/1985 | Wolfe et al. | 4,709,008 A | 11/1987 | Shimp |
| 4,535,117 A | 8/1985 | Mathis et al. | 4,714,768 A | 12/1987 | Hemkielm et al. |
| 4,536,559 A | 8/1985 | Lubowitz et al. ........... 428/290 | 4,716,212 A | 12/1987 | Gaughan |
| 4,547,553 A | 10/1985 | Lubowitz et al. | 4,719,283 A | 1/1988 | Bartmann |
| 4,555,563 A | 11/1985 | Hefner, Jr. et al. | 4,727,118 A | 2/1988 | Egami |
| 4,556,697 A | 12/1985 | Curatolo et al. | 4,728,742 A | 3/1988 | Renner |
| 4,556,705 A | 12/1985 | McCready | 4,730,030 A | 3/1988 | Hahn et al. |
| 4,558,120 A | 12/1985 | Tomalia et al. | 4,737,550 A | 4/1988 | Tomalia |
| 4,562,231 A | 12/1985 | Dean | 4,739,030 A | 4/1988 | Lubowitz et al. |
| 4,562,232 A | 12/1985 | Smith | 4,739,075 A | 4/1988 | Odagiri et al. |
| 4,563,498 A | 1/1986 | Lucas | 4,739,115 A | 4/1988 | Byrd et al. |
| 4,563,514 A | 1/1986 | Liu et al. | 4,740,563 A | 4/1988 | McCready et al. |
| 4,564,553 A | 1/1986 | Pellegrini et al. | 4,740,564 A | 4/1988 | McCready et al. |
| 4,567,216 A | 1/1986 | Qureshi et al. | 4,740,584 A | 4/1988 | Shimp |
| 4,567,240 A | 1/1986 | Hergenrother et al. | 4,742,166 A | 5/1988 | Renner |
| 4,568,737 A | 2/1986 | Tomalia et al. | 4,748,227 A | 5/1988 | Matzner et al. |
| 4,574,144 A | 3/1986 | Yates, III et al. | 4,755,584 A | 7/1988 | Tomioka et al. |
| 4,574,148 A | 3/1986 | Wicker, Jr. et al. | 4,755,585 A | 7/1988 | Hanson et al. |
| 4,574,154 A | 3/1986 | Okamoto et al. | 4,757,118 A | 7/1988 | Das et al. |
| 4,576,857 A | 3/1986 | Gannett et al. | 4,757,128 A | 7/1988 | Domb et al. |
| 4,577,034 A | 3/1986 | Durvasula | 4,757,150 A | 7/1988 | Guggenheim et al. |
| 4,578,433 A | 3/1986 | Muenstedt et al. | 4,759,986 A | 7/1988 | Marikar et al. |
| 4,578,470 A | 3/1986 | Webb | 4,760,106 A | 7/1988 | Gardner et al. |
| 4,584,364 A | 4/1986 | Lubowitz et al. | 4,764,427 A | 8/1988 | Hara et al. |
| 4,587,329 A | 5/1986 | Tomalia et al. | 4,766,180 A | 8/1988 | Wong |
| 4,590,363 A | 5/1986 | Bernard | 4,766,197 A | 8/1988 | Clendinning et al. |
| 4,599,383 A | 7/1986 | Satoji | 4,769,424 A | 9/1988 | Takekoshi et al. |
| 4,600,769 A | 7/1986 | Kumar et al. | 4,769,426 A | 9/1988 | Iwasaki et al. |
| 4,604,437 A | 8/1986 | Renner | 4,769,436 A | 9/1988 | Beck et al. |
| 4,608,414 A | 8/1986 | Kitsunai et al. | 4,774,282 A | 9/1988 | Qureshi |
| 4,608,426 A | 8/1986 | Stern | 4,777,208 A | 10/1988 | Hefner, Jr. |
| 4,611,022 A | 9/1986 | Hefner, Jr. | 4,778,830 A | 10/1988 | Streu et al. |
| 4,611,048 A | 9/1986 | Peters | 4,778,859 A | 10/1988 | Ai et al. |
| 4,614,767 A | 9/1986 | Dean | 4,778,898 A | 10/1988 | Vonlanthen et al. |
| 4,615,832 A | 10/1986 | Kress et al. | 4,786,669 A | 11/1988 | Dewhirst |
| 4,616,070 A | 10/1986 | Zeiner et al. | 4,786,685 A | 11/1988 | Takida et al. |
| 4,616,071 A | 10/1986 | Holubka | 4,786,713 A | 11/1988 | Rule et al. |
| 4,617,390 A | 10/1986 | Hoppe et al. | 4,798,685 A | 1/1989 | Yaniger |
| 4,624,888 A | 11/1986 | St. Clair et al. | 4,798,686 A | 1/1989 | Hocker et al. |
| 4,628,067 A | 12/1986 | Chen, Sr. et al. | 4,798,882 A | 1/1989 | Petri |

| | | |
|---|---|---|
| 4,801,676 A | 1/1989 | Hisgen et al. |
| 4,801,677 A | 1/1989 | Eckhardt et al. |
| 4,804,722 A | 2/1989 | Hesse et al. |
| 4,804,724 A | 2/1989 | Harris et al. |
| 4,806,407 A | 2/1989 | Skinner et al. |
| 4,808,717 A | 2/1989 | Saito et al. |
| 4,812,518 A | 3/1989 | Haubennestel et al. |
| 4,812,534 A | 3/1989 | Blakely |
| 4,812,552 A | 3/1989 | Cliffton et al. |
| 4,812,588 A | 3/1989 | Schrock |
| 4,814,416 A | 3/1989 | Poll |
| 4,814,417 A | 3/1989 | Sugimori |
| 4,814,421 A | 3/1989 | Rosenquist |
| 4,814,472 A | 3/1989 | Lau |
| 4,816,503 A | 3/1989 | Cunningham et al. |
| 4,816,526 A | 3/1989 | Bristowe et al. |
| 4,816,527 A | 3/1989 | Rock |
| 4,816,556 A | 3/1989 | Gay et al. |
| 4,820,770 A | 4/1989 | Schleifstein |
| 4,826,927 A | 5/1989 | Schmid et al. |
| 4,826,997 A | 5/1989 | Kirchhoff |
| 4,827,000 A | 5/1989 | Schwartz |
| 4,829,138 A | 5/1989 | Barthelemy |
| 4,835,197 A | 5/1989 | Mercer |
| 4,837,256 A | 6/1989 | Gardner et al. |
| 4,839,378 A | 6/1989 | Koyama et al. |
| 4,845,150 A | 7/1989 | Kovak et al. |
| 4,845,167 A | 7/1989 | Alston et al. |
| 4,845,185 A | 7/1989 | Teramoto et al. |
| 4,845,278 A | 7/1989 | Erhan |
| 4,847,333 A | 7/1989 | Lubowitz et al. |
| 4,851,280 A | 7/1989 | Gupta |
| 4,851,287 A | 7/1989 | Hartsing, Jr. |
| 4,851,494 A | 7/1989 | Eldin et al. |
| 4,851,495 A | 7/1989 | Sheppard et al. |
| 4,851,496 A | 7/1989 | Poll et al. |
| 4,851,501 A | 7/1989 | Lubowitz et al. |
| 4,851,505 A | 7/1989 | Hayes |
| 4,861,855 A | 8/1989 | Bockrath et al. |
| 4,861,882 A | 8/1989 | Hergenrother et al. |
| 4,861,915 A | 8/1989 | Clendinning et al. |
| 4,861,924 A | 8/1989 | Riggs |
| 4,868,270 A | 9/1989 | Lubowitz et al. |
| 4,871,475 A | 10/1989 | Lubowitz et al. |
| 4,874,834 A | 10/1989 | Higashi et al. |
| 4,876,325 A | 10/1989 | Olson et al. |
| 4,876,328 A | 10/1989 | Lubowitz et al. |
| 4,876,330 A | 10/1989 | Higashi et al. |
| 4,891,167 A | 1/1990 | Clendinning et al. |
| 4,891,408 A | 1/1990 | Newman-Evans |
| 4,891,460 A | 1/1990 | Ishii |
| 4,895,892 A | 1/1990 | Satake et al. |
| 4,895,924 A | 1/1990 | Satake et al. |
| 4,897,527 A | 1/1990 | Cripps et al. |
| 4,902,335 A | 2/1990 | Kume et al. |
| 4,902,440 A | 2/1990 | Takeyama et al. |
| 4,902,769 A | 2/1990 | Cassidy et al. |
| 4,902,773 A | 2/1990 | Bodnar et al. |
| 4,916,210 A | 4/1990 | Jackson |
| 4,916,235 A | 4/1990 | Tan et al. |
| 4,919,992 A | 4/1990 | Blundell et al. |
| 4,923,752 A | 5/1990 | Cornelia |
| 4,927,899 A | 5/1990 | Michaud et al. |
| 4,927,900 A | 5/1990 | Michaud et al. |
| 4,931,531 A | 6/1990 | Tamai et al. |
| 4,931,540 A | 6/1990 | Mueller et al. |
| 4,935,523 A | 6/1990 | Lubowitz et al. |
| 4,958,031 A | 9/1990 | Sheppard et al. |
| 4,965,336 A | 10/1990 | Lubowitz et al. |
| 4,973,662 A | 11/1990 | Odagiri et al. |
| 4,980,481 A | 12/1990 | Lubowitz et al. ............ 548/435 |
| 4,981,922 A | 1/1991 | Sheppard et al. |
| 4,985,568 A | 1/1991 | Lubowitz et al. |
| 4,990,624 A | 2/1991 | Sheppard et al. |
| 4,996,101 A | 2/1991 | Landis et al. |
| 5,003,035 A | 3/1991 | Tsai et al. |
| 5,011,905 A | 4/1991 | Lubowitz et al. |
| 5,066,541 A | 11/1991 | Lubowitz et al. |
| 5,066,776 A | 11/1991 | Russeler et al. |
| 5,075,537 A | 12/1991 | Lorenzen et al. |
| 5,082,905 A | 1/1992 | Lubowitz et al. |
| 5,086,154 A | 2/1992 | Camberlin et al. |
| 5,087,701 A | 2/1992 | Lubowitz et al. |
| 5,104,967 A | 4/1992 | Sheppard et al. |
| 5,109,105 A | 4/1992 | Lubowitz et al. |
| 5,111,026 A | 5/1992 | Ma |
| 5,112,936 A | 5/1992 | Okamoto |
| 5,112,939 A | 5/1992 | Lubowitz et al. ....... 528/170 X |
| 5,115,087 A | 5/1992 | Sheppard et al. |
| 5,116,935 A | 5/1992 | Lubowitz et al. |
| 5,120,819 A | 6/1992 | Lubowitz et al. |
| 5,126,410 A | 6/1992 | Lubowitz et al. |
| 5,144,000 A | 9/1992 | Sheppard et al. |
| 5,151,487 A | 9/1992 | Lubowitz et al. |
| 5,155,206 A | 10/1992 | Lubowitz et al. |
| 5,159,055 A | 10/1992 | Sheppard et al. |
| 5,175,233 A | 12/1992 | Lubowitz et al. ........... 528/170 |
| 5,175,234 A | 12/1992 | Lubowitz et al. |
| 5,175,304 A | 12/1992 | Sheppard |
| 5,198,526 A | 3/1993 | Lubowitz et al. |
| 5,210,213 A | 5/1993 | Sheppard et al. |
| 5,216,117 A | 6/1993 | Sheppard et al. |
| 5,227,461 A | 7/1993 | Lubowitz et al. ....... 528/170 X |
| 5,230,956 A | 7/1993 | Cole et al. |
| 5,239,046 A | 8/1993 | Lubowitz et al. |
| 5,254,605 A | 10/1993 | Kim et al. |
| 5,268,519 A | 12/1993 | Sheppard et al. |
| 5,286,811 A | 2/1994 | Lubowitz et al. |
| 5,338,532 A | 8/1994 | Tomalia et al. |
| 5,344,894 A | 9/1994 | Lubowitz et al. |
| 5,594,089 A * | 1/1997 | Lubowitz et al. ........... 528/171 |

FOREIGN PATENT DOCUMENTS

| | | |
|---|---|---|
| EP | 0277476 | 8/1988 |
| EP | 0266662 | 11/1988 |
| EP | 0289798 | 11/1988 |
| EP | 0292434 | 11/1988 |
| EP | 0292677 | 11/1988 |
| EP | 0294555 | 12/1988 |
| EP | 0132547 | 2/1989 |
| EP | 0305882 | 3/1989 |
| EP | 0309649 | 4/1989 |
| EP | 0310735 | 4/1989 |
| EP | 0311735 | 4/1989 |
| EP | 0317754 | 5/1989 |
| EP | 0323540 | 7/1989 |
| EP | 0336856 | 10/1989 |
| EP | 0405128 | 1/1991 |
| EP | 0418406 | 3/1991 |
| EP | 0334778 | 4/1992 |
| FR | 71.00975 | 1/1971 |
| FR | 2166209 | 8/1973 |
| FR | 2210635 | 7/1974 |
| FR | 2272119 | 12/1975 |
| FR | 2303818 | 10/1976 |
| GB | 1099096 | 1/1968 |
| GB | 1453625 | 10/1976 |
| GB | 2002378 A | 2/1977 |
| GB | 2002378 B | 3/1982 |
| GB | 907105 | 4/1999 |
| GB | 1069061 | 1/2001 |
| JP | 1453625 | 12/1973 |

| | | | | |
|---|---|---|---|---|
| JP | 58059-219 | 10/1981 | | |
| JP | 100111 | 6/1982 | | |
| JP | 5710011-1 | 6/1982 | | |
| JP | 59219 | 4/1983 | ................ | 528/171 |
| JP | 0289695 | 1/1988 | | |
| JP | 1210-408 A | 2/1988 | | |
| WO | 81/01855 | 7/1981 | | |
| WO | 84/04313 | 11/1984 | | |

OTHER PUBLICATIONS

Elsenbaumer et al., *Highly Conductive Meta Derivatives of Poly(phenylene Sulfide)* J. Polymer Sci: Polymer Phys. Ed., vol. 20, 1781–1787. 1982.

Patel et al,, *Poly–Schiff Bases, I. Preparation of Poly–Schiff Bases from 4,4'–Diacetyl Diphenyl Ether (DDE) with Various Diamines* J. of Polymer Sci: Polymer Chem. Ed., vol. 20, 1985–1992, 1982.

Walton, *A New Conjugated Network Polymer as an Electrical Conductor and Thermally Stable Plastic* Am. Chem., Soc. Org. Coat Plast. Chem., vol. 42, 595–599, 1980.

Serafini et al., *Thermally Stable Polyimides from Solutions of Monomeric Reactants* Journal of Applied Polymer Science, vol. 16, pp. 905–915, 1972.

Spillman et al., *Copolymers of Poly(Para–Phenylene Terephthalamide) Containing a Thermally Activated Cross–Linking Agent* PMSE vol. 68, Spring Meetings 139–140, 1993.

Radlmann, et al., *New Synthesis of Poly(ether Ketones).* (44195h) Chem. Abstracts vol. 72, 1970, p. 44187. 1970.

Bryant, et al., *Synthesis and Properties of Phenylethynyl–Terminated Polyimides* Polymer PrePrints, vol. 34, No. 1, 566–567, Mar. 1993.

Crivello, et al. *Polyimidothioether–Polysulfide Block Polymers* Polymer Sci., Polymer Chem. Ed., vol. 3, pp. 1819–1842, 1975.

Frazer, *High Temperature Resistant Polymers* Interscience Publishers, John Wiley & Sons, Inc., 139–213, 1968.

Mittal (ed), *Polyimides* Plenum Press, NY, vol. 1 & 2 (selected pages),

St. Clair et al., *The Development of Aerospace Polyimide Adhesives* Mittal (ed), Polyimides—Synthesis Characterization and Applications, Plenum Press, NY, vol. 2, pp. 977–1041, 1973.

Serafini, et al., *A Review of Processable High Temperature Resistant Addition–type Laminating Resins* Mittal (ed) Polyimides—Synthesis, Characterization and Applications, Plenum Press, NY, vol. 1, pp. 89–95, 1973.

Stenson, *Polycyanurates Find Applications; Their Chemistry Remains Puzzling* Science/Technology, 208 ACS National Meeting, Washington, D,C., C&EN Northeast News Bureau 30–31, Sep. 1994.

Stoakley, et al., *Low–Dielectric–Constant Polyimide/Glass Composites* NASA Tech. Briefs p. 24, Apr. 1994.

Bartolotta, *Predicting Fatigue Lives of Metal–Matrix/Fiber Composites* NASA Tech Briefs pp. 28, 30, Apr. 1994.

Vannucci, et al., *Improved PMR Polyimides for Heat–Stable Laminates* NASA Tech Briefs pp. 30–31, Apr. 1994.

Bryant, et al., *Phenylethynyl End–Capping Reagents and Reactive Diluents* NASA Tech Briefs pp. 36–37, Apr. 1994.

Jensen, et al., *Phenylethynyl–Terminated Ploy (Arlene Ethers)* NASA Tech Briefs p. 37, Apr. 1994.

Buckley, et al., *Processable Polyimides for High Temperature Applications* 36th International SAMPE Symposium pp. 1172–1181, Apr. 1991.

Edwards, et al. Constituents of the Higher Fungi. Part XIII.[1] 2–Arly–3–methoxymaleic Anhydrides from Pulvinic Acid Derivatives. A Convenient Method for Determination of Structure of Fungaland Lichen Pulvinic Acid Derivatives, Journal of The Chemical Society pp. 1538–1542, 1973.

Kwiatkowski, et al., *Thermosetting Diphenyl Sulfone–Baed Malcimides* Journal of Polymer Science, vol. 13, pp. 961–972, 1975.

Lyle, et al., *Polyarylene Ethers: Maleimides, Nadimides and Blends* The Interdisciplinary Symposium on Recent Advances in Polyimides and Other High Performance Polymers, San Diego, California pp. K–1–K–7, Jan. 1990.

Roberts, et al., *Effect of Solution Concentration and Aging Conditions on PMR–15 Resin* SAMPE Journal, pp. 24–28, 213, Mar./Apr. 1986.

Southcott, et al., "The Development of Processable, Fully Imidized, Polyimides for High–Temperature Applications" High Perform. Polym. 6, pp. 1–12, Printed in UK, 1994.

* cited by examiner

POLYESTER OLIGOMER

REFERENCE TO RELATED APPLICATIONS

This application is a divisional application based upon U.S. patent application Ser. No. 07/131,493, filed Dec. 23, 1987, now U.S. Pat. No. 5,705,598, which was a continuation-in-part application based upon U.S. patent application Ser. No. 06/726,259, filed Apr. 23, 1985, now abandoned.

TECHNICAL FIELD

The present invention relates to linear or multidimensional polyester oligomers and blends that include unsaturated hydrocarbon end caps to provide solvent resistance through crosslinking upon curing. Preferably the backbone includes electronegative ("sulfone") segments that alternate with the ester linkages.

BACKGROUND ART

Recently, chemists have sought to synthesize oligomers for high performance advanced composites suitable for aerospace applications. These composites should exhibit solvent resistance, be tough, impact resistant, and strength, be easy to process, and be thermoplastic. Oligomers and composites that have thermo-oxidative stability, and, accordingly can be used at elevated temperatures, are particularly desirable.

While epoxy-based composites are suitable for many applications, their brittle nature and susceptibility to degradation make them inadequate for many aerospace applications, especially those applications which require thermally stable, tough composites. Accordingly, research has recently focused upon polyimide composites to achieve an acceptable balance between thermal stability, solvent resistance, and toughness. The maximum use temperatures of conventional polyimide composites, such as PMR-15, are still only about 600–625° F., since they have glass transition temperatures of about 690° F.

Linear polysulfone, polyether sulfone, polyester, and polyamide systems are also known, but each of these systems fails to provide as high thermal stability as is required in some aerospace applications.

There has been a progression of polyimide sulfone compounds synthesized to provide unique properties or combinations of properties. For example, Kwiatkowski and Brode synthesized maleic-capped, linear polyarylimides as disclosed in U.S. Pat. No. 3,839,287. Holub and Evans synthesized maleic- or nadic-capped, imido-substituted polyester compositions as disclosed in U.S. Pat. No. 3,729,446. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones (i.e., heterocycles), polybutadienesulfones, and "star" or "starburst" multidimensional oligomers. We have shown surprisingly high glass transition temperatures and desirable physical properties in many of these oligomers and their composites, without losing ease of processing.

Multidimensional oligomers, such as disclosed in our U.S. Pat. No. 5,210,213; are easier to process than many other advanced composite oligomers since they can be handled at lower temperatures. Upon curing, however, the unsaturated phenylimide end caps crosslink so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined-with well-known diluents, such as styrene, do not exhibit satisfactory thermal and oxidative resistance to be useful for aircraft or aerospace applications. Polyarylesters are unsatisfactory, also, since the resins often are semicrystalline which makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, end-capped polyester imide ether sulfone oligomers that have an acceptable combination of solvent resistance, toughness, impact resistance, strength, ease of processing, formability, and thermal resistance. By including Schiff base (—CH=N—), imidazole, thiazole, or oxazole linkages in the oligomer chain, the linear, advanced composites formed with polyester oligomers of our copending application U.S. Ser. No. 726, 259 now abandoned, can have semiconductive or conductive properties when appropriately doped.

Conductive and semiconductive plastics have been extensively studied (see, e.g., U.S. Pat. Nos. 4,375,427; 4,338, 222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) ease of processing, (5) impact resistance (and other matrix stress transfer capabilities), (6) retention of properties (over a broad range of temperatures), and (7) high temperature resistance that is desirable on aerospace advanced composites. These prior art composites are often too brittle.

Thermally stable multidimensional oligomers having semiconductive or conductive properties when doped with suitable dopants are also known and are described in our copending applications (including U.S. Ser. No. 773,381 now U.S. Pat. No. 5,968.640 to Lubowitz, Sheppard, and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap (i.e., a radical having one or two crosslinking sites) to allow controlled crosslinking upon heat-induced or chemically-induced curing.

Polyamides of this same general type are described in U.S. Pat. No. 4,876,328; polyetherimides, in U.S Pat. No. 5,104,965 and polyamideimides, in U.S. Pat. No. 5,164,967.

SUMMARY OF THE INVENTION

High performance, aerospace advanced composites can be prepared using crosslinkable, end-capped polyester sulfone oligomers of the present invention that have a desired blend of solvent resistance, toughness, impact resistance, strength, ease of processing, formability, and thermal resistance. The linear polyester oligomers include compounds selected from the group consisting of:

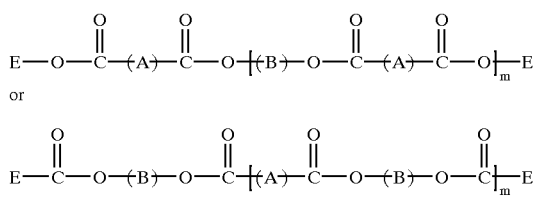

and are prepared by the condensation of acid halides (or acids) and dialcohols (bisphenols), wherein:

E=a crosslinkable (unsaturated) end cap to improve the solvent resistance of the cured oligomer in the advanced composite;

A=a residue of a dicarboxylic acid halide; and

B=a residue of a dialcohol.

Generally, A and B are each linear aromatic moieties that include electronegative ("sulfone") linkages between aromatic radicals. Suitable electronegative linkages are selected from $-SO_2-$, $-S-$, $-O-$, $-CO-$, $-(CH_3)_2C-$, and $-(CF_3)_2C-$. Schiff base ($-CH=N-$), oxazole, thiazole, and imidazole linkages can also be used in the backbone where semiconductive or conductive advanced composites are desired, since these linkages are conductive when suitably doped. Preferred Schiff base oligomers have the general formula:

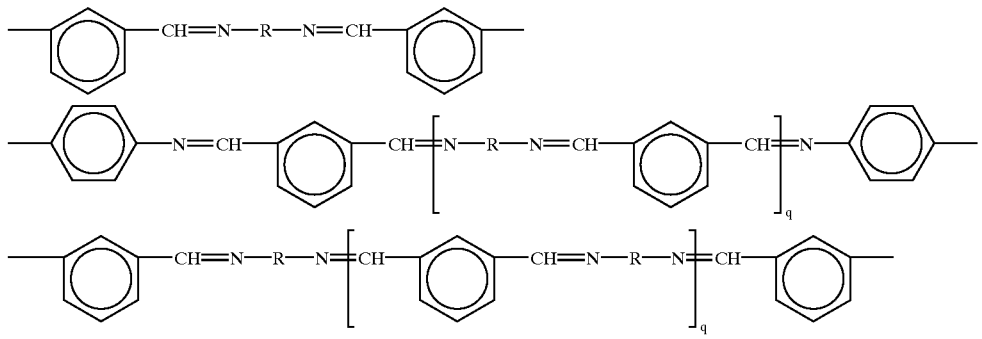

wherein

R=an aromatic moiety or a short aryl chain including a plurality of aryl moieties linked with any of $-CH_2-$, $-SO_2-$, $-S-$, $-O-$, $-CO-$, $-(CH_3)_2C-$, or $-(CF_3)_2C-$; and q=0–4.

The crosslinkable end caps (E) are usually imidophenols or phenylimide acid halides that include a radical selected from the group consisting of:

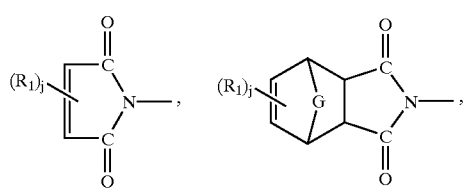

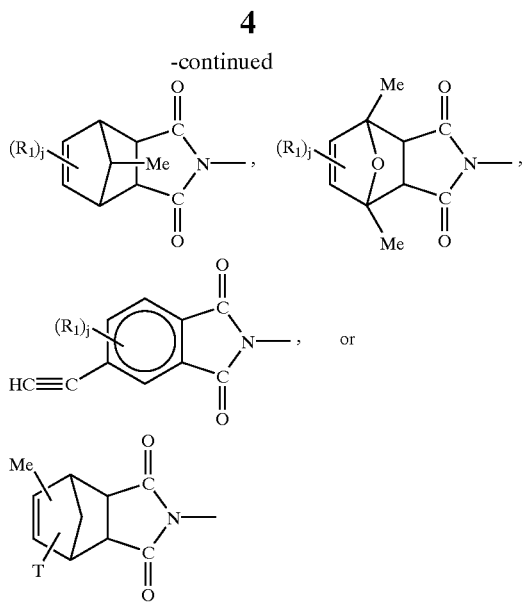

wherein $R_1$=lower alkyl, lower alkoxy, aryl, aryloxy, substituted alkyl, substituted aryl, halogen, or mixtures thereof;

j=0, 1, or 2;

G=$-CH_2-$, $-O-$, $-S-$, or $-SO_2-$;

T=methallyl or allyl; and

Me=methyl.

Multidimensional oligomers include an aromatic hub and three or more arms wherein each arm includes an ester linkage and an end cap.

Blends of the linear or multidimensional oligomers comprise mixtures of the oligomers and one or more compatible, noncrosslinking polymers, and may be interpenetrating networks (IPNs).

The oligomers and blends can be processed with suitable reinforcing additives in continuous or chopped form to make prepregs. Upon curing, the composites are relatively thermally stable, tough, and solvent resistant.

The oligomers are prepared by simultaneously condensing the end caps, dicarboxylic acid halides, and dialcohols, (and hubs, if making multidimensional oligomers) in a suitable solvent under an inert atmosphere.

BEST MODE CONTEMPLATED FOR MAKING AND USING THE PRESENT INVENTION

Linear polyester oligomers of the present invention have the general formula:

$$E-O-\overset{O}{\underset{\|}{C}}-(A)-\overset{O}{\underset{\|}{C}}-O+(B)-O-\overset{O}{\underset{\|}{C}}-(A)-\overset{O}{\underset{\|}{C}}-O\}_m-E$$

or $$E-\overset{O}{\underset{\|}{C}}-O-(B)-O-\overset{O}{\underset{\|}{C}}+(A)-\overset{O}{\underset{\|}{C}}-O-(B)-O-\overset{O}{\underset{\|}{C}}\}_m-E$$

wherein E=a crosslinkable end cap radical preferably selected from the group consisting of:

[structural formulas of end cap radicals]

wherein $R_1$=lower alkyl, lower alkoxy, aryl, aryloxy, substituted alkyl, substituted aryl, halogen, or mixtures thereof;

j=0, 1, or 2;

G=—$CH_2$—, —O—, —S—, or —$SO_2$—;

T=methallyl or allyl;

Me=methyl;

A=the residue of a dicarboxylic acid halide (i.e. diacid halide);

B=the residue of a dialcohol; and m=an integer, usually between 0 and 50.

The condensation can occur between alcohol (phenol) and acid halide functionalities or the corresponding acid or phenate groups.

The linear oligomers are usually prepared by reacting:

(a) 2 moles of a crosslinkable end-cap acid halide of the general formula $(E)_i-\phi$-COX;

(b) n moles of an aromatic diacid halide or of a difunctional chain including a plurality of aryl rings linked with at least one linkage selected from the group consisting of —$SO_2$—, —O—, —S—, —CO—, —$(CH_3)_2C$—, —$(CF_3)_2C$—, or mixtures thereof throughout the chain, the chain having an acid halide functionality on each end; and (c) (n+1) moles of an aromatic dialcohol having terminal —OH functionalities, or by reacting:

(a) 2 moles of a crosslinkable end-cap phenol of the general formula $(E)_i-\phi$-OH;

(b) (n+1) moles of an aromatic diacid halide or of a difunctional chain including a plurality of aryl rings linked with at least one linkage selected from the group consisting of —$SO_2$—, —O—, —S—, —CO—, —$(C_3)_2C$—, —$(CF_3)_2C$—, or mixtures thereof throughout the chain, the chain having an acid halide functionality on each end; and (c) n moles of an aromatic dialcohol (diol) having terminal —OH functionalities.

The diacid halide (or dicarboxylic acid, if desired) generally includes an aromatic radical selected from the group consisting of:

(a) phenyl; (b) naphthyl; (c) biphenyl;

(d) a polyaryl "sulfone" divalent radical of the general formula:

[structural formulas of polyaryl divalent radicals]

wherein

D=—S—, —O—, —CO—, —$SO_2$—, —$(CH_3)_2C$—, —$(CF_3)_2$ C—, or mixtures thereof throughout the chain;

(e) a divalent radical having conductive linkages, illustrated by Schiff base compounds selected from the group consisting of:

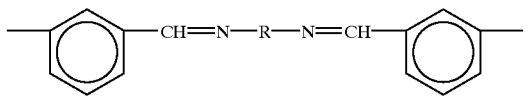
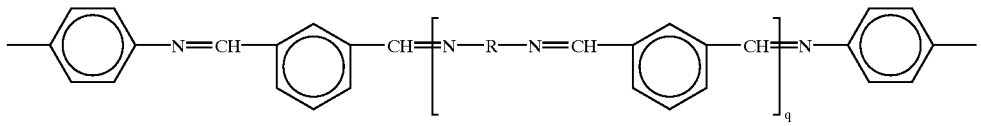
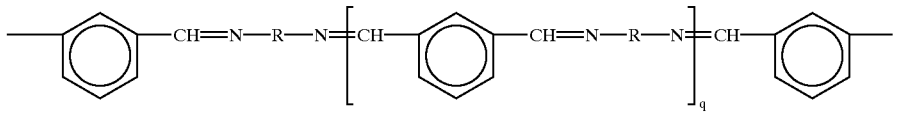
wherein
R is selected from the group consisting of:
phenyl; biphenyl; naphthyl; or
a divalent radical of the general formula:
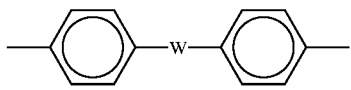
wherein W=—$SO_2$— or —$CH_2$—; and q=0–4; or
(f) a divalent radical of the general formula:
wherein $R^1$=a $C_2$ to $C_{12}$ divalent aliphatic alicyclic, or aromatic radical, and, preferably, phenyl (as described in U.S. Pat. No. 4,556,697).
The preferred diacid halides include:
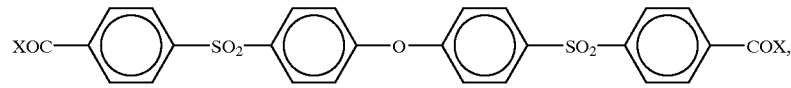
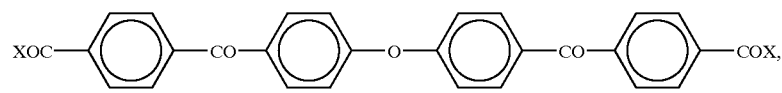
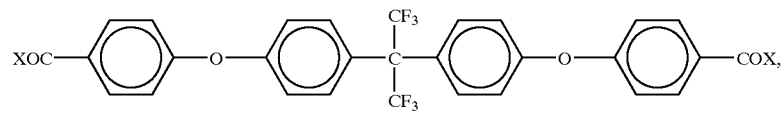
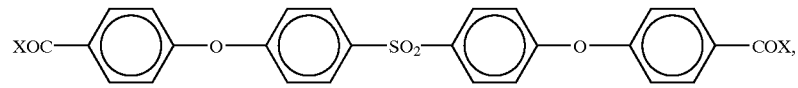
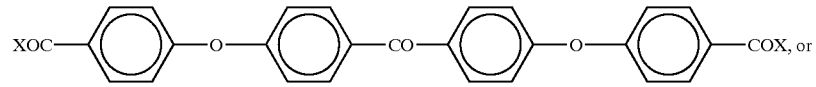
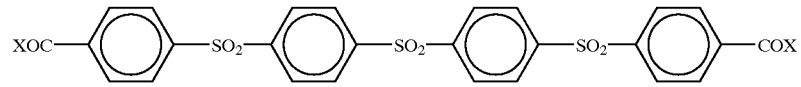

Schiff base acid halides can be prepared by the condensation of aldehydes and amines in the general reaction scheme:

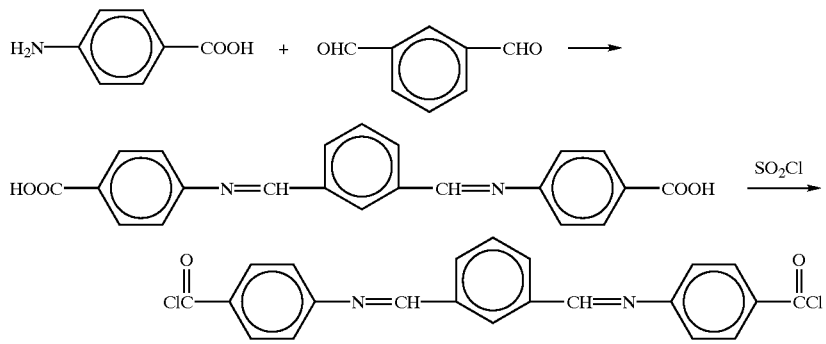

or similar schemes.

Thiazole, oxazole, or imidazole linkages, especially between aryl groups, nay also be used in the conductive or semiconductive oligomers along with or in place of the Schiff base linkages.

Other diacid halides that can be used, but that are not preferred, are disclosed in U.S. Pat. No. 4,504,632, and include:

adipylchloride, malonyl chloride, succinyl chloride, glutaryl chloride, pimelic acid dichloride, suberic acid dichloride, azelaic acid dichloride, sebacic acid dichloride, dodecandioic acid dichloride, phthaloyl chloride, isophthaloyl chloride, terephthaloyl chloride, 1,4-naphthalene dicarboxylic acid dichloride, and 4,4'-diphenylether dicarboxylic acid dichloride.

Polyaryl or aryl diacid halides are preferred to achieve the highest thermal stabilities in the resulting oligomers and composites insofar as aliphatic bonds are not as thermally stable as aromatic bonds. Particularly preferred compounds include intermediate electronegative ("sulfone") linkages to improve toughness of the resulting oligomers. For purposes of this description, "sulfone" linkages include —$SO_2$—, —S—, —CO—, and —$(CF_3)_2C$—, unless clearly limited to only —$SO_2$—.

The dialcohol (i.e. diol, dihydric phenol, or bisphenol) is generally selected from the group consisting of:

HO—Ar—OH;

HO—Ar—L—Ar'—L—Ar—OH;

HO—Ar'—L—Ar—L—Ar'—OH;

wherein
L=—$CH_2$—, —$(CH_3)_2C$—, —$(CF_3)_2C$—, —O—, —S—, —$SO_2$—, or —CO—;

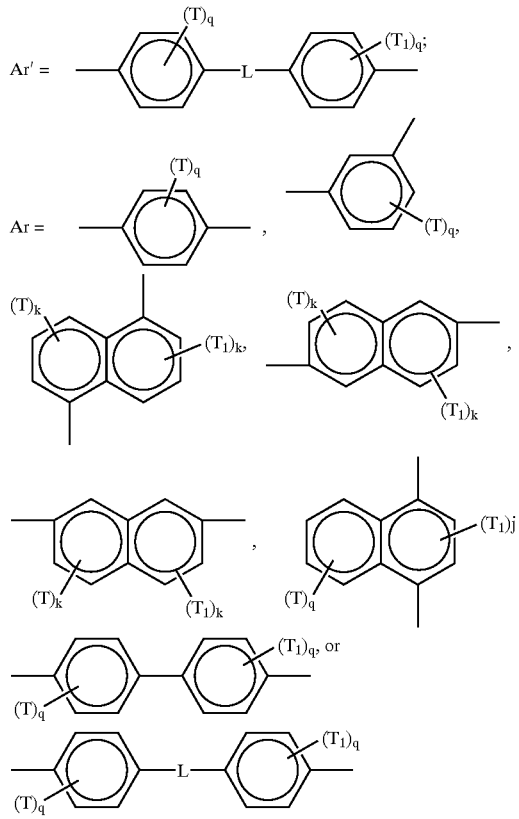

T and $T_1$=lower alkyl, lower alkoxy, aryl, aryloxy, substituted alkyl, substituted aryl, halogen, or mixtures thereof;

q=0–4;

k=0–3; and j=0, 1, or 2,

The dialcohols also include hydroquinone; bisphenol-A; p,p'-biphenol; 4,4'-dihydroxydiphenylsulfide; 4,4'-dihydroxydiphenylether; 4,4'-dihydroxydiphenylisopropane; 4,4'-dihydroxydiphenylhexafluoropropane; a dialcohol having a Schiff base segment, the radical being selected from the group consisting of:

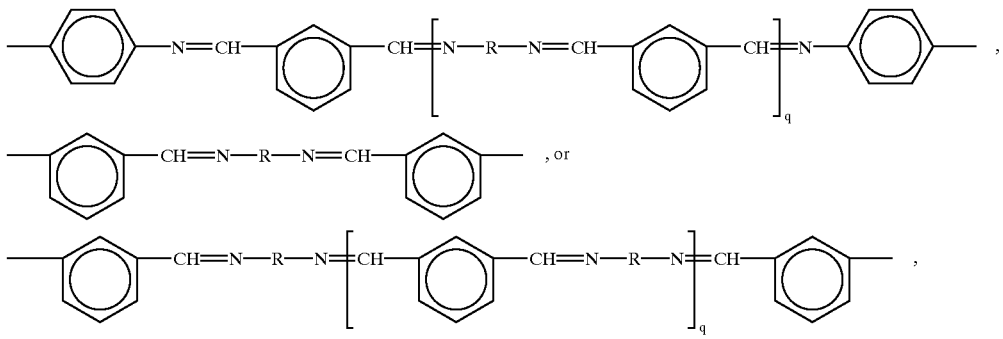

wherein R is selected from the group consisting of:
 phenyl;
 biphenyl;
 naphthyl; or
 a radical of the general formula:

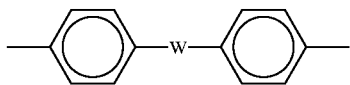

wherein W=—CH$_2$— or —SO$_2$—; or
 a dialcohol selected from the group:

wherein
L is as defined above;
Me=methyl;
m=an integer, generally less than 5, and preferably 0 or 1; and
D=any of —CO—, —SO$_2$—, or —(CF$_3$)$_2$C—.

While bisphenol-A is preferred in the etherimide synthesis (because of cost and availability), the other dialcohols can be used to add rigidity to the oligomer without significantly increasing the average formula weight, and, therefore, can increase the solvent resistance. Random or a block copolymers are possible.

Furthermore, the dialcohols may also be selected from the those described in U.S. Pat. Nos. 4,584,364; 3,262,914; or 4,611,048.

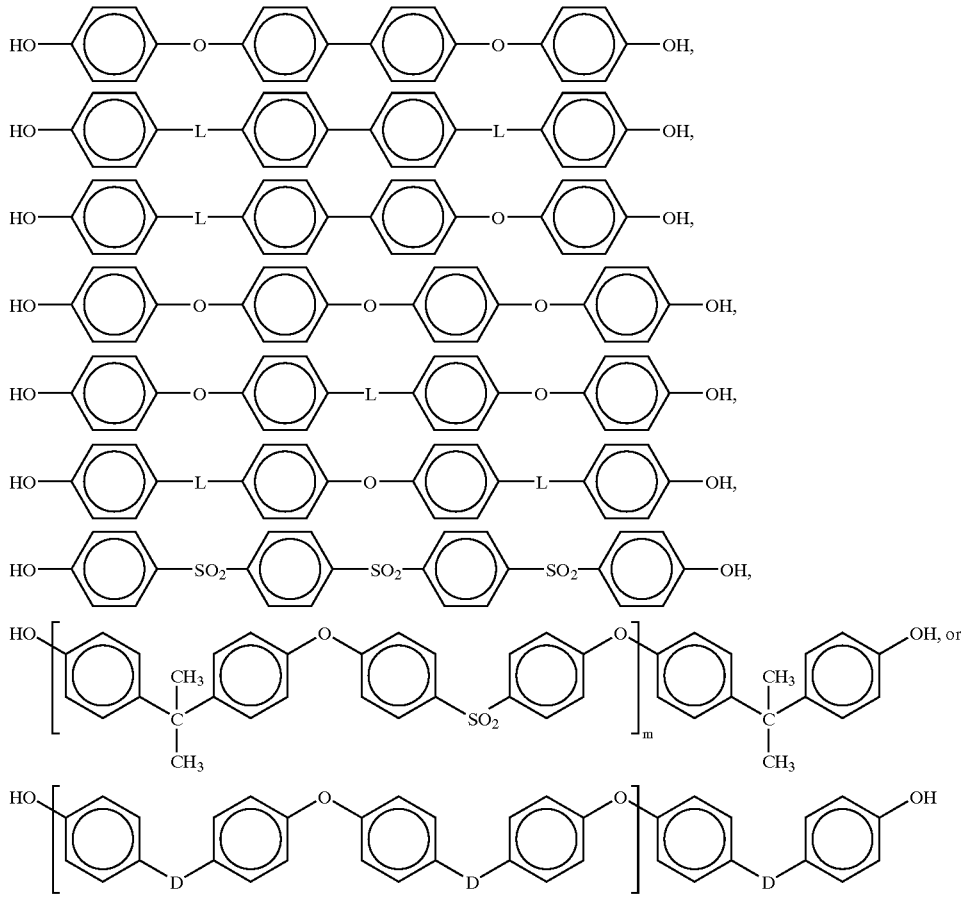

Dialcohols of this nature are commercially available. Some may be easily synthesized by reacting halide intermediates with bis-phenates, such as by the reaction of 4,4'-dichlorodiphenylsulfone with bis(disodium biphenolate).

Schiff base diols are prepared by the condensation of aldehydes and amines under the general reaction schemes:

While illustrated for preparing Schiff base diacid halides and diols, these reaction schemes are representative of the processes used to prepare any of the diacid halides or diols used in the polymerization reactions. Inexpensive, commercially available starting compounds are used, such as aminophenol.

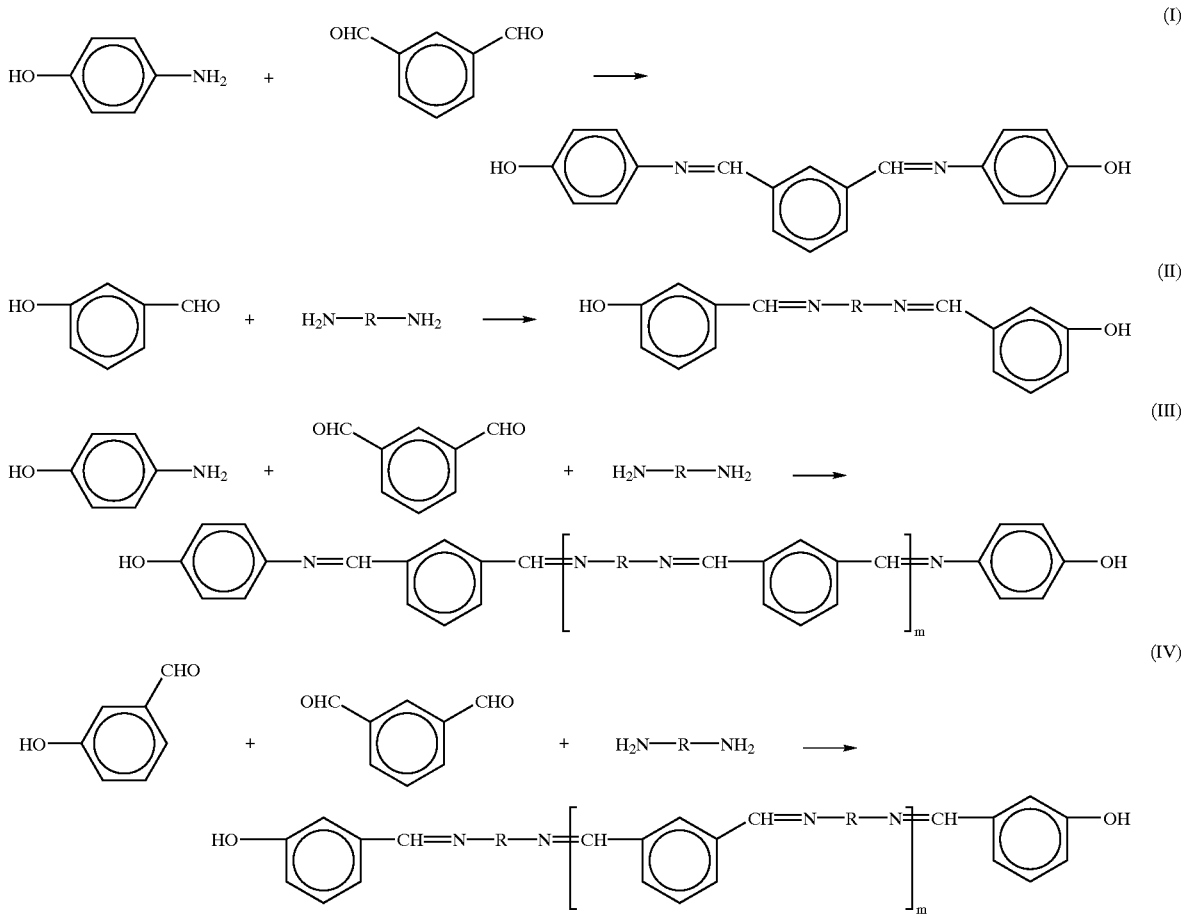

Polyester Schiff base compounds are then prepared by condensing the Schiff base diols with end cap acid halides (or carboxylic acids), and diacid halide chains.

Schiff base acid halides can be prepared by the general reaction scheme:

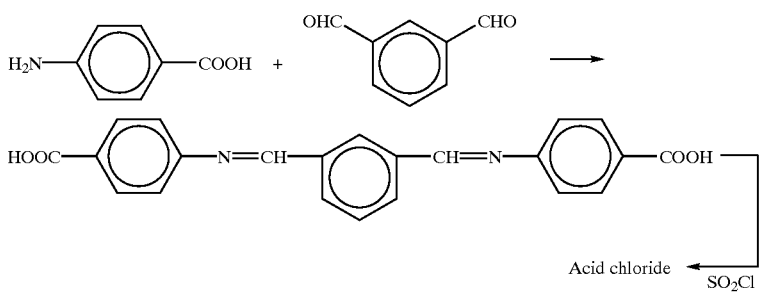

or similar schemes as with the diols. The resulting polyesters are made by condensing the acid halides with suitable diols.

Dopants for creating semiconductive or conductive composites are generally selected from two of the three categories commonly used to dope other polymers, namely (I) dispersions of alkali metals (for high activity) or (II) strong chemical oxidizers, particularly alkali perchlorates (for lower activity). Arsenic compounds and elemental halogens, while active dopants, are too dangerous for general usage, and are not recommended.

The dopants react with the polymers to form charge transfer complexes. N-type semiconductors result from doping with alkali metal dispersions. P-type semiconductive result from doping with elemental iodine or perchlorates.

While research into conductive or semiconductive polymers has been intense, the resulting compounds, mainly polyacetylenes, polyphenelenes, and polyvinylacetylenes, are unsatisfactory for aerospace applications because the polymers are:

(a) unstable in air;

(b) unstable at high temperatures;

(c) brittle after doping;

(d) toxic because of the dopants; or (e) intractable.

The polymers of the present invention exhibit greater oxidative stability and greater dimensional stability at elevated temperatures, greater impact strengths and greater dimensional stiffness over a wider range of temperatures, and toughness over those oligomers of the prior art.

While conventional theory holds that semiconductive polymers should have low ionization potentials, long conjugation lengths, and planar backbones, there is an inherent trade-off, between conductivity and toughness or ease of processing, if these constraints are followed. To overcome the processing and toughness shortcomings common with Schiff base, polyoxazole, polyimidazole; and polythiazole polymers, in the present invention, the polymers include mechanical swivels interspersed along the backbone coupling the rigid, conductive ribbons. Thermally stable swivels are afforded through "sulfone" linkages, particularly in phenoxyphenylsulfone or phenoxyphenylketone moieties.

The conductive, semiconductive, and nonconductive polymers are usually made by mixing the appropriate proportions of the reactants in a polar organic solvent at temperatures between about −30 to 100° C. Stepwise synthesis may also be used, if desired, as outlined for the Schiff base oligomers.

Because the aromatic polyester sulfone resins synthesized in accordance with this invention have appreciable molecular weight between the reactive groups, the oligomers will retain sufficient plasticity to be processible during fabrication prior to crosslinking of the end caps to thermoset composites. If possible, thermoplastic formulations with even higher molecular weights should be synthesized. The polyesters preferably have MWs between about 5000–40,000, and, more preferably, between about 15,000–25,000.

Because it may be difficult to make diols or diacid chlorides having intermediate benzimidazole, benzoxazole, or benzothiazole linkages, and because the chemistry for Schiff base compounds is well understood, it is preferred to use Schiff base segments in the oligomers for semiconductive or conductive applications.

Solubility of the oligomers becomes an increasing problem as the length of the chains increases. Therefore, shorter chains are preferred, if the resulting oligomers remain easily processed. That is, the chains should be long enough to yield thermoplastic characteristics but short enough to keep the oligomers soluble during the reaction sequence.

Blends can improve impact resistance of composites prepared from the crosslinkable oligomers without causing a significant loss of solvent resistance. The blends comprise mixtures of one or more crosslinkable oligomers and one or more polymers that are incapable of crosslinking, and generally comprise substantially equimolar amounts of one polymer and an oligomer having substantially identical backbones. The cross-linkable oligomer and comparable polymer can be blended together by mixing mutually soluble solutions of each. While the blend is preferably equimolar in the oligomer and polymer, the ratio of the oligomer and polymer can be adjusted to achieve the desired physical properties.

Although the polymer in the blend usually has the same type of backbone (i.e. polyester sulfone) and same length backbone as the oligomer the properties of the composite formed from the blend can be adjusted by altering the ratio of formula weights for the polymer and oligomer. The oligomer and polymer generally have substantially identical repeating units, but the oligomer and polymer merely need be compatible in the solution prior to sweeping out as a prepreg. Of course, if the polymer and oligomer have identical backbones, compatibility in the blend is likely to occur.

Quenching compounds can be employed, if desired to regulate the polymerization of the comparable polymer, so that it has an average formula weight substantially identical with the crosslinkable oligomer. For thermal stability, an aromatic quenching compound, such as phenol or benzoic acid chloride, is preferred.

The noncrosslinking polymer can be made by the same synthetic method as the oligomer with the substitution of a quenching cap for the crosslinking end cap.

While the best blends are probably those in which the backbones are essentially identical and of modest formula weight and those in which the oligomer and polymer are in equimolar proportions, other compositions may be prepared, as will be recognized by those of ordinary skill in the art.

Solvent resistance may decrease markedly if the comparable polymer is provided in large excess to the crosslinkable oligomer in the blend.

As discussed, the blends will generally comprise a mixture of one oligomer and a polymer of the same type. The polymer may, however, be from another family, such as an ester, imide, ether, or amide. The mixture may include multiple oligomers or multiple polymers, such as a three component mixture of oligomers and polymers. Other combinations will be recognized by those of ordinary skill in the art.

The blends may be semi-interpenetrating networks of the general type described by Egli et al., "Semi-Interpenetrating Networks of LARC-TPI" available from NASA-Langley Research Center.

Multidimensional polyesters (of the general formula: Ar—($-$Q)$_w$, wherein Ar=an aromatic radical of valence w, Q=a polyester radical having a crosslinking end cap and w is an integer greater than or equal to 3) can also be prepared by linking polyester sulfone or polyester arms to an aromatic hub. The multidimensional oligomers, then, have three or more chains radiating from the hub like rays or spokes. Each chain includes a crosslinking end-cap radical at its distal end to provide one or two crosslinking sites. Accordingly, the multidimensional oligomers have a greater number (i.e. higher density) of crosslinking bonds when cured than the linear oligomers.

Usually the hub will have three radiating chains to form a "Y" pattern. In some cases, four chains may be used. Including more chains leads to steric hindrance as the hub is too small to accommodate the radiating chains. A trisubstituted phenyl hub (such as phloroglucinol) is highly preferred with the chains being symmetrically placed about the hub. Biphenyl, naphthyl, or azaline (e.g., melamine) may also be used as the hub radical along the other aromatic moieties, if desired.

Triazine derivatives described in U.S. Pat. No. 4,617,390 (or the corresponding acid halides) can be used as the hub. Other suitable triazine derivatives (described in U.S. Pat. No. 4,574,154) that are suitable hubs can be made by reacting a compound of the general formula:

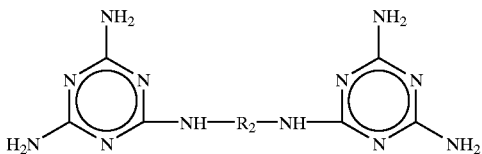

wherein $R_2$ is a divalent hydrocarbon residue containing 1–12 carbon atoms (and, preferably, ethylene) with phthalic acid anhydride to form arms that include imide linkages and terminal acid functionalities (that can be converted to acid halides, if desired).

Other acid halide (or carboxylic acid) hubs can be made by reacting polyol aromatic hubs, such as phloroglucinol, with nitrobenzoic acid or nitrophthalic acid to form ether linkages and active, terminal carboxylic acid functionalities. The nitrobenzoic acid products would have three active sites while the nitrophthalic acid products would have six; each having the respective formula:

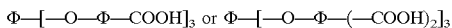

wherein Φ=phenyl. Of course other nitro/acids can be used.

Hubs can also be formed by reacting the corresponding halo-hub (such a tribromobenzene) with aminophenol to form triamine compounds represented by the formula:

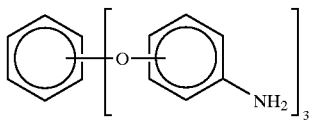

which can then be reacted with an acid anhydride to form a polycarboxylic acid of the formula:

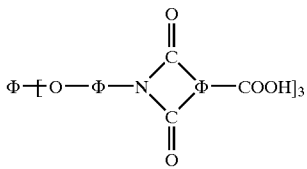

wherein Φ=phenyl; the hub being characterized by an intermediate ether and imide linkage connecting aromatic groups. Thio-analogs are also contemplated, in accordance with U.S. Pat. No. 3,933,862.

Phenoxyphenyl sulfone arms radiating from a hub with a terminal amine, carboxylic acid, or hydroxyl group are also precursors for making multidimensional polyester oligomers of the present invention.

The best results are likely to occur when the hub is phloroglucinol or cyuranic acid. In either case a suitable end-cap monomer (phenol or acid halide) can be reacted with the hub to form "short-armed," multidimensional oligomers having three or six crosslinking sites. These compounds are the simplest multidimensional oligomers and are relatively inexpensive to synthesize.

The multidimensional oligomers are generally prepared by simultaneously reacting the hub with dialcohols; diacid halides dialcohols and diacid halides; and suitable end-cap monomers unreaction conditions similar to those for the linear oligomers. Care should be taken, however, to reduce the likelihood of undesirable side reactions. For example, a mixture of about 1 mole of the hub, w moles of dialcohol, w moles of diacid halide, and w moles of end-cap monomer is likely to form a complex mixture of multidimensional and linear oligomers and polymers. Accordingly, staged or stepwise reaction of the several reactants is preferred in this synthesis.

Thus, the oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form advanced composites.

Blends of the multidimensional oligomers, comparable to the blends of linear oligomers, can also be prepared, as will be understood.

The preferred aromatic moieties in the linear or multidimensional oligomers are aryl groups, such as phenyl, biphenyl, and naphthyl. Other aromatic groups can be used, if desired, since their stabilized aromatic bonds should provide the desired thermal stability. For example, azaline groups may be used. As discussed earlier, the aryl groups may include substituents, if desired, such as halogen, lower alkyl up to about 4 carbon atoms, lower alkoxy up to about 4 carbon atoms, or aryl side chains. Steric hindrance may arise in synthesizing the oligomers or in cross-linking the oligomers into cured composites, if the side chains are too large. The substituents may also effect the thermal stability of the resulting oligomers and composites. Unsubstituted phenyl groups are preferred for cost, convenience, and performance. The m-isomer may be preferred, since it tends to create a folded ribbon structure in the backbone.

Prepregs of the oligomers or blends can be prepared by conventional techniques. While woven fabrics are the typical reinforcement, the fibers can be continuous or discontinuous (in chopped or whisker form) and may be ceramic, organic, carbon (graphite), or glass, as suited for the desired application.

Composites can be formed by curing the oligomers or prepregs in conventional vacuum bag techniques. The oligomers can also be used as adhesives, varnishes, films, or coatings.

While preferred embodiments have been described, those skilled in the art will readily recognize alterations, variations, and modifications which might be made without departing from the inventive concept. Therefore, the claims should be interpreted liberally with the support of the full range of equivalents known to those of ordinary skill on the basis of this description. The claims should be limited only as is necessary in view of the pertinent prior art.

We claim:

1. A linear polyester oligomer useful for forming advanced composites, comprising:

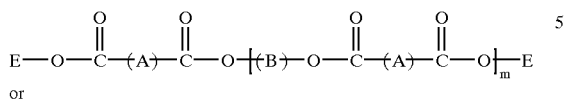

or

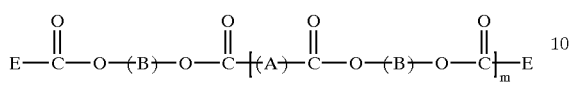

wherein the polyester oligomer is formed by the simultaneous condensation of diacid halides, dialcohols, and end-cap monomers and wherein E is a crosslinkable end cap radical to improve the solvent resistance of the cured oligomer in the advanced composite and is:

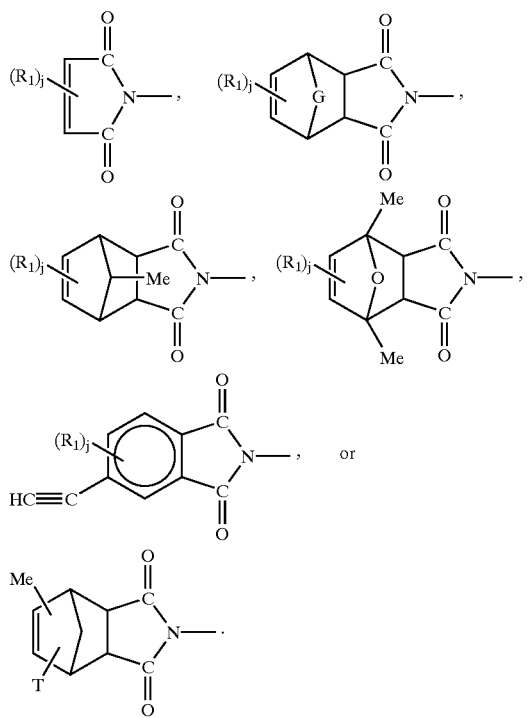

$R_1$ is lower alkyl, lower alkoxy, aryl, aryloxy, substituted alkyl, substituted aryl, halogen, or mixtures thereof;

j is 0, 1, or 2;

G is —$CH_2$—, —O—, —S—, or —$SO_2$—;

T is methallyl or allyl;

Me is methyl;

A is a residue of a dicarboxylic acid halide; and

B is a residue of a dialcohol.

2. The oligomer of claim 1 wherein both A and B are linear aromatic radicals having a plurality of aromatic groups linked together by linkages selected from the group consisting of: —CO—; —O—; —S—; —$SO_2$—; —$(CH_3)_2C$—; —$(CF_3)_2C$—; —CH=N—; oxazole; thiazole; and imidazole.

3. The oligomer of claim 2 wherein the aromatic groups of both A and B are selected from the group consisting of phenyl, biphenyl, naphthyl, and mixtures thereof.

4. The oligomer of claim 3 wherein A includes a radical of the general formula:

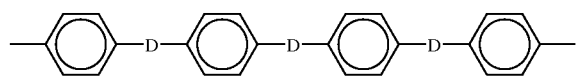

wherein D is:

—$SO_2$—, —S—, —CO—, —O—, —$(CH_3)_2C$—, —$(CF_3)_2C$—, or mixtures thereof.

5. The oligomer of claim 4 wherein the radical is a phenoxyphenylsulfone of the general formula:

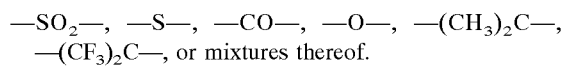

6. A prepreg comprising the oligomer of claim 1 and a reinforcing additive in fiber or particulate form.

7. A composite comprising the cured prepreg of claim 6.

8. A blend comprising the oligomer of claim 1 and a compatible, non-crosslinking polymer.

9. A composite comprising the cured blend of claim 8.

10. The blend of claim 8 comprising substantially equimolar amounts of the oligomer and polymer.

11. The blend of claim 8 wherein the polymer is a polyester sulfone.

12. The blend of claim 8 wherein the average formula weight of the oligomer is less than that of the polymer.

13. A prepreg comprising the blend of claim 8 and a reinforcing additive in fiber or particulate form.

14. A composite comprising the cured prepreg of claim 13.

15. A composite comprising the cured oligomer of claim 1.

16. An oligomer useful for forming advanced composites, comprising the product of the process of reacting about:

(a) 2 moles of a crosslinkable end cap acid halide of the general formula: $D_i$—Ø—COX, wherein Ø is phenyl;

D is

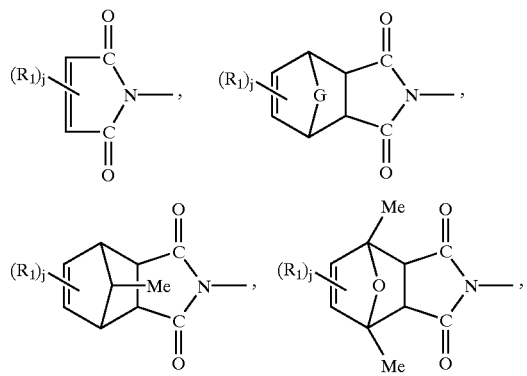

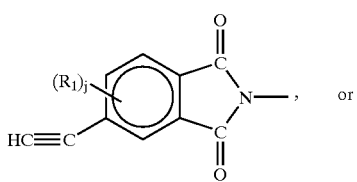, or

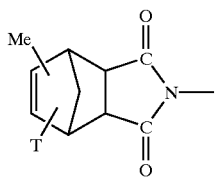

X is halogen;

i is 1 or 2;

$R_1$ is lower alkyl, lower alkoxy, aryl, aryloxy, substituted alkyl, substituted aryl, halogen, or mixtures thereof;

j is 0, 1, or 2;

G is —$CH_2$—, —O—, —S—, or —$SO_2$—;

T is methallyl or allyl; and

Me is methyl;

(b) n moles of a dicarboxylic acid halide or of a chain including a plurality of aryl rings linked with at least one linkage selected from the group consisting of —$SO_2$—, —O—, —S—, —CO—, —$(CH_3)_2C$—, —$(CF_3)_2C$—, and mixtures thereof throughout the chain, the chain having an acid halide functionality on each end; and (c) (n+1) moles of a diol having terminal —OH functionalities, wherein n is an integer greater than or equal to 1.

17. The oligomer of claim 16 wherein the diol is selected from the group consisting of:

HO—Ar—OH;

HO—Ar—L—Ar'—L—Ar—OH; and

HO—Ar'—L—Ar—L—Ar'—OH;

wherein L=—$CH_2$—, —$(CH_3)_2C$—, —$(CF_3)_2C$—, —O—, —S—, —$SO_2$—, or —CO—;

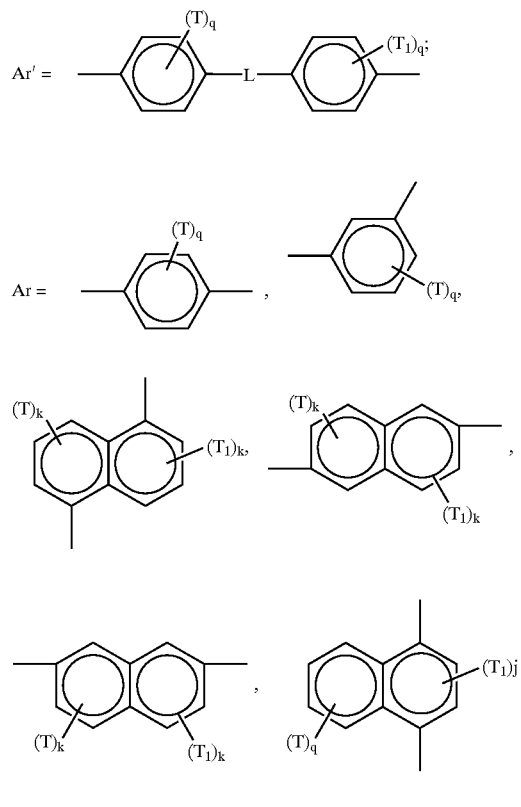

T and $T_1$=lower alkyl, lower alkoxy, aryl, aryloxy, substituted alkyl, substituted aryl, halogen, or mixtures thereof;

q=0–4;

k=0–3; and j=0, 1, or 2.

18. The oligomer of claim 16 wherein the diol is hydroquinone, bisphenol-A, p,p'-biphenol, 4,4'-dihydroxydiphenylsulfide, 4,4'-dihydroxydiphenylether, 4,4'-dihydroxydiphenylisopropane, 4,4'-dihydroxydiphenylhexafluoropropane,

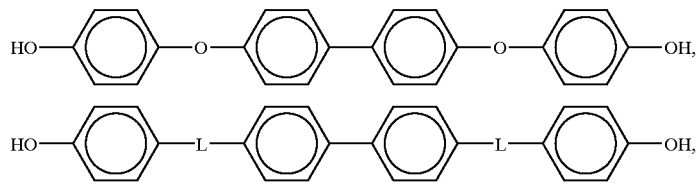

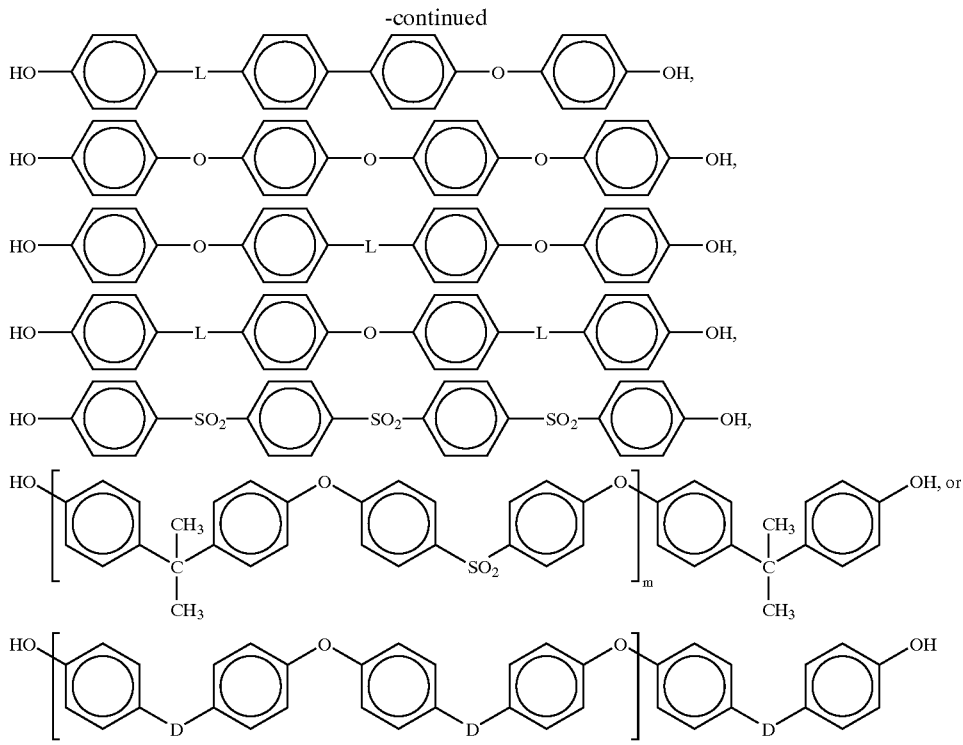

wherein L=—S—, —O—, —CO—, —SO₂—, —(CH₃)₂C—; or —(CF₃)₂C—;
Me=methyl;
m=an integer less than or equal to 5; and
D=any of —CO—, —SO₂—, or —(CF₃)₂C—.

19. The oligomer of claim 18 wherein the dicarboxylic acid halide includes a Schiff base segment being:

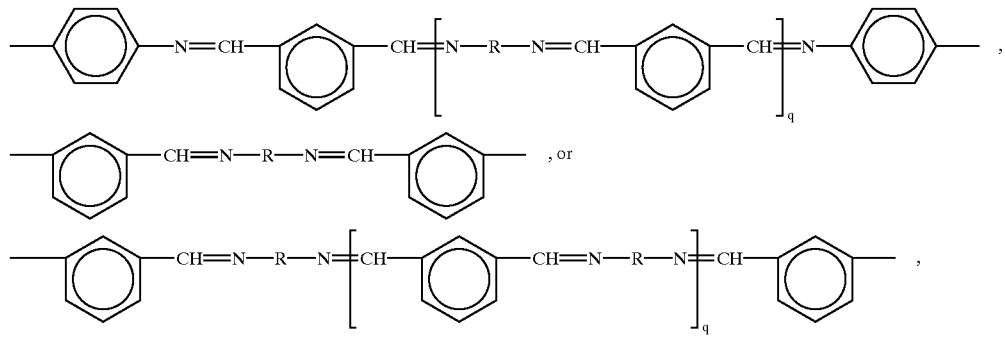

wherein R is:
phenyl;
biphenyl;
naphthyl; or
a radical of the general formula:

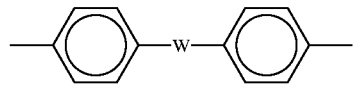

wherein W=—CH— or —SO₂—.

20. The oligomer of claim 18 wherein the dicarboxylic acid halide includes a radical selected from the group consisting of:

(a) phenyl;
(b) naphthyl;
(c) biphenyl;
(d) a polyaryl divalent radical of the general formula:

and

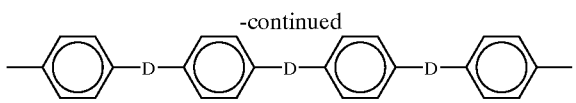

wherein D is —S—, —O—, —CO—, —SO$_2$—, —(CH$_3$)$_2$C—, —(CF$_3$)$_2$C—, or mixtures thereof throughout the chain;

(e) a divalent radical having conductive linkages, illustrated by Schiff base compounds selected from the group consisting of:

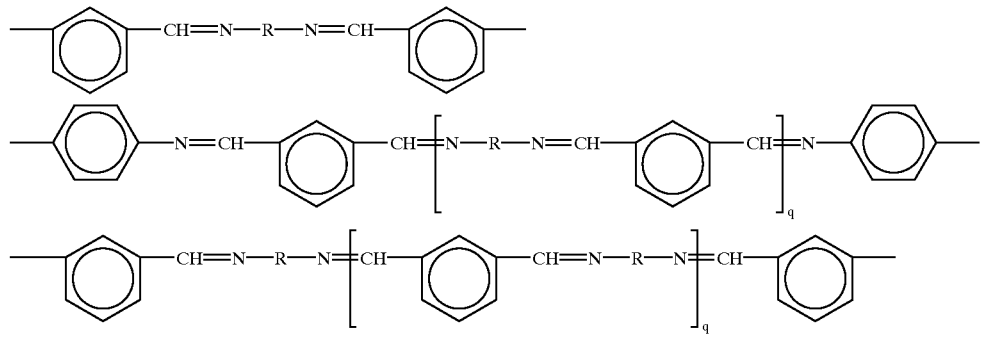

wherein R is:
phenyl; biphenyl; naphthyl; or a divalent radical of the general formula:

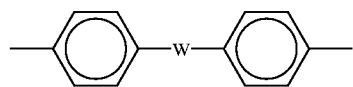

wherein W is —SO$_2$— or —CH$_2$—; and q is 0–4; and (f) a divalent radical of the general formula:

wherein R$^1$=a C$_2$ to C$_{12}$ divalent aliphatic, alicyclic, or aromatic radical.

21. The oligomer of claim 18 wherein the dicarboxylic acid halide is:

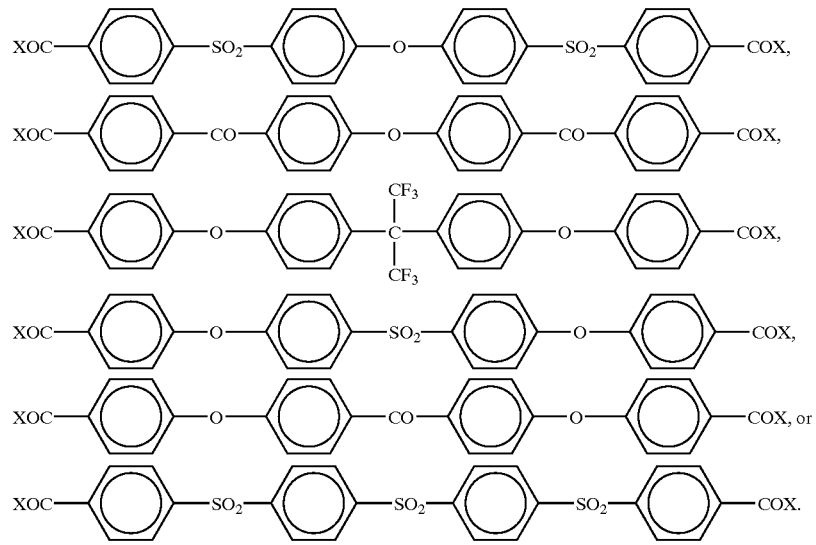

22. The oligomer of claim 18 wherein the diacid halide has the general formula:

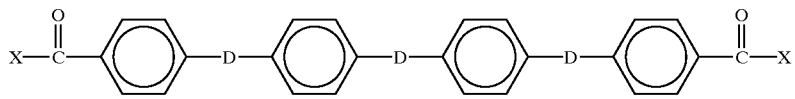

wherein D=—S—, —O—, —CO—, —SO$_2$—, —(CH—)$_2$C—, —(CF$_3$)$_2$C—, or, mixtures thereof throughout the chain.

23. The oligomer of claim 16 wherein the dicarboxylic acid halide includes a radical selected from the group consisting of:

(a) phenyl;
(b) naphthyl;
(c) biphenyl;
(d) a polyaryl divalent radical of the general formula:

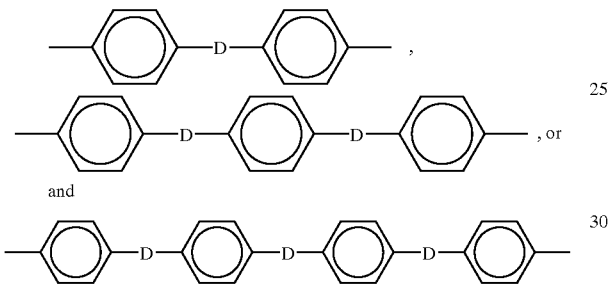

wherein D is —S—, —O—, —CO—, —SO$_2$—, —(CH$_3$)$_2$C—, —(CF$_3$)$_2$C—, and mixtures thereof throughout the chain;

(e) a divalent radical having conductive linkages, illustrated by Schiff base compounds selected from the group consisting of:

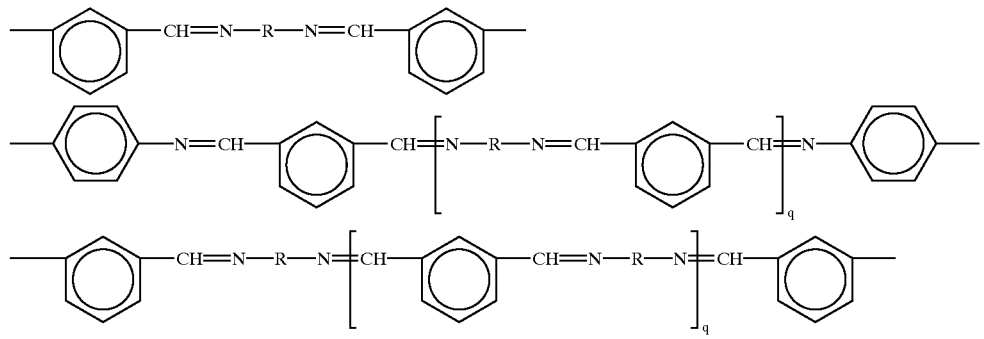

wherein R is phenyl; biphenyl; naphthyl; or a divalent radical of the general formula:

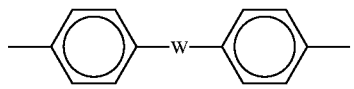

wherein W is —SO$_2$— or —CH$_2$—; and q is 0–4; and (f) a divalent radical of the general formula:

wherein R$^1$ is a C$_2$ to C$_{12}$ divalent aliphatic, alicyclic, or aromatic radical.

24. The oligomer of claim 23 wherein the dicarboxylic acid halide is:

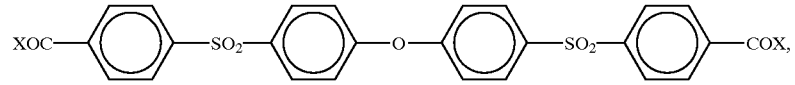

-continued

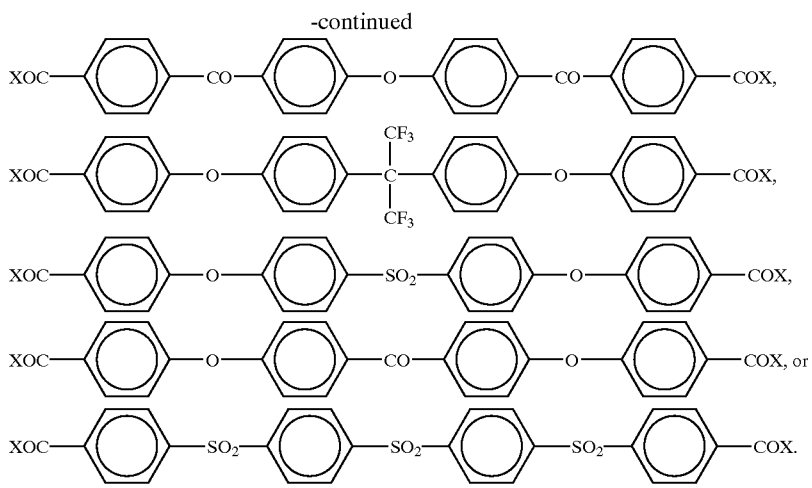

25. The oligomer of claim 24 wherein the diol includes a Schiff base segment selected from the group consisting of:

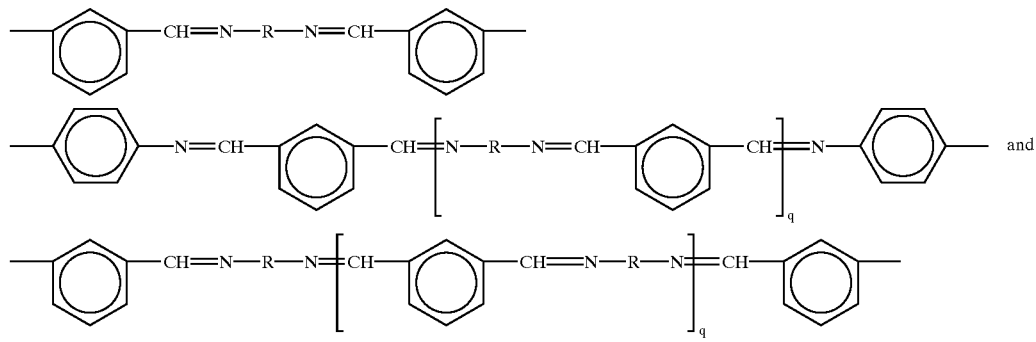

wherein R is:

phenyl, biphenyl, naphthyl, or a compound of the general formula:

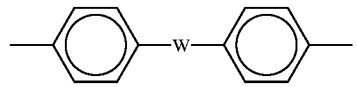

wherein W is —$CH_2$— or —$SO_2$—; and q is 0–4.

26. A prepreg comprising the oligomer of claim 16 and a reinforcing additive in fiber or particulate form.

27. A prepreg comprising the oligomer of claim 20 and a reinforcing additive in fiber or particulate form.

28. A blend comprising the oligomer of claim 16 and a compatible, non-crosslinking polymer.

29. A prepreg comprising, the blend of claim 28 and a reinforcing additive in fiber or particulate form.

30. A blend comprising the oligomer of claim 22 and a compatible, non-crosslinking polymer.

31. A prepreg comprising the blend of claim 30 and a reinforcing additive in fiber or particulate form.

32. A linear polyester oligomer useful for forming advanced composites, comprising:

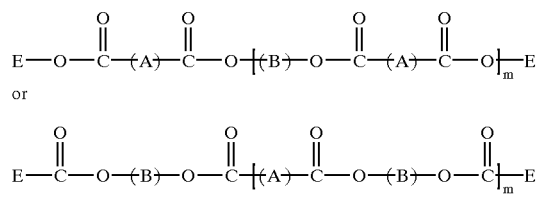

wherein the polyester oligomer is formed by the simultaneous condensation of diacid halides, dialcohols, and endcap monomers and wherein E is a crosslinkable end cap radical to improve the solvent resistance of the cured oligomer in the advanced composite and is:

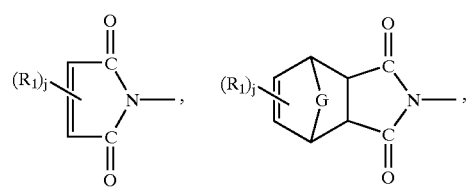

-continued

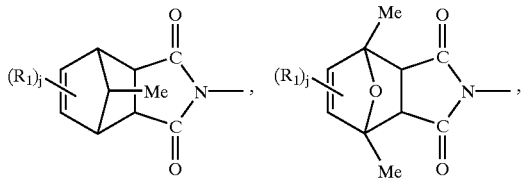

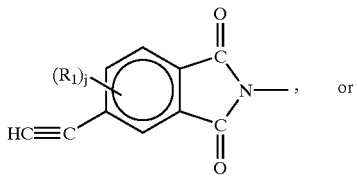

wherein A includes a radical of the general formula:

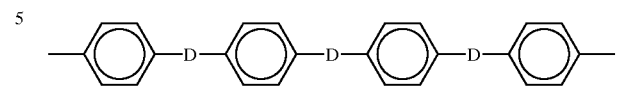

wherein D is:
—SO$_2$—, —S—, —CO—, —O—, —(CH$_3$)$_2$C—, —(CF$_3$)$_2$C—, or mixtures thereof, and
wherein B includes one or more linkages selected from the group consisting of —CH=N— oxazole, thiazole, and imidazole.

33. The oligomer of claim 32 is a Schiff base having the general formula:

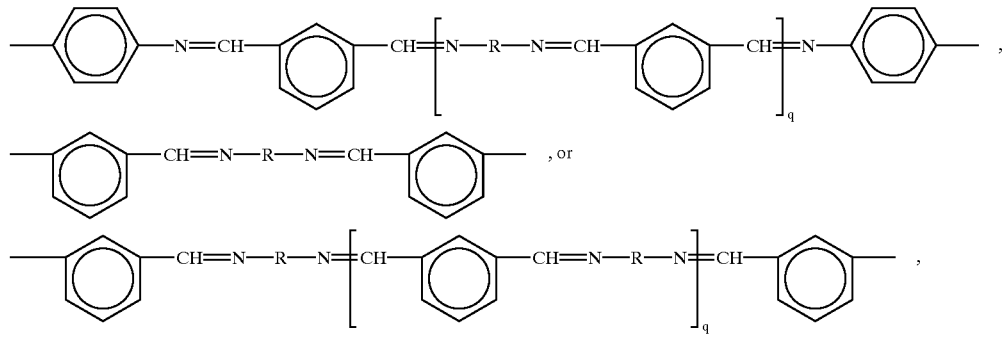

-continued

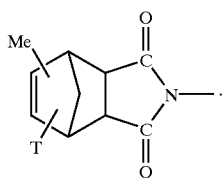

R$_1$ is lower alkyl, lower alkoxy, aryl, aryloxy, substituted alkyl, substituted aryl, halogen, or mixtures thereof;

j is 0, 1, or 2;

G is —CH$_2$—, —O—, —S—, or —SO$_2$—;

T is methallyl or allyl;

Me is methyl;

A is a residue of a dicarboxylic acid halide;

B is a residue of a dialcohol;

wherein both A and B are linear aromatic radicals having a plurality of aromatic groups linked together by linkages selected from the group consisting of: —CO—; —O—; —S—; —SO$_2$—; —(CH$_3$)$_2$C—; —(CF$_3$)$_2$C—; —CH=N—; oxazole; thiazole; and imidazole; wherein the aromatic groups of both A and B are selected from the group consisting of phenyl, biphenyl, naphthyl, and mixtures thereof;

wherein R=an aromatic moiety or a short aryl chain including a plurality of aryl moieties linked with any of —CH$_2$—, —CO—, —SO$_2$—, —O—, —S—, —(CH$_3$)$_2$C—, or —(CF$_3$)$_2$C—; and q=0–4.

34. The oligomer of claim 33 wherein R is phenyl, biphenyl, naphthyl, or a radical of the general formula:

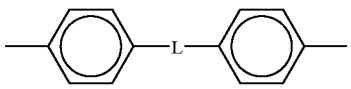

wherein L is —CH$_2$—, —SO$_2$—, —CO—, —O—, —S—, —(CH$_3$)$_2$C—, or —(CF$_3$)$_2$C—.

35. The oligomer of claim 32 wherein R is selected from the group of radicals consisting of:

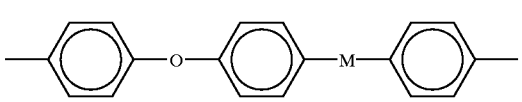

wherein M=—SO$_2$—, —CO—, —O—, —S—, —(CH$_3$)$_2$C—, or —(CF$_3$)$_2$C—.

36. The oligomer of claim 35 wherein R is a phenoxyphenylsulfone.

37. An oligomer useful for forming advanced composites, comprising the product of the process of reacting about:
(a) 2 moles of a crosslinkable end cap phenol of the general formula:

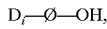

(b) (n+1) moles of a dicarboxylic acid halide/or of a chain including a plurality of aryl rings linked with at least one linkage selected from the group consisting of —SO$_2$—, —O—, —S—, —CO—, —(CH$_3$)$_2$C—, —(CF$_3$)$_2$C—, and mixtures thereof throughout the chain, the chain having an acid halide functionality on each end; and (c) n moles of a diol having terminal —OH functionalities, wherein the diol, the diacid halide, or both includes a Schiff base segment being one of:

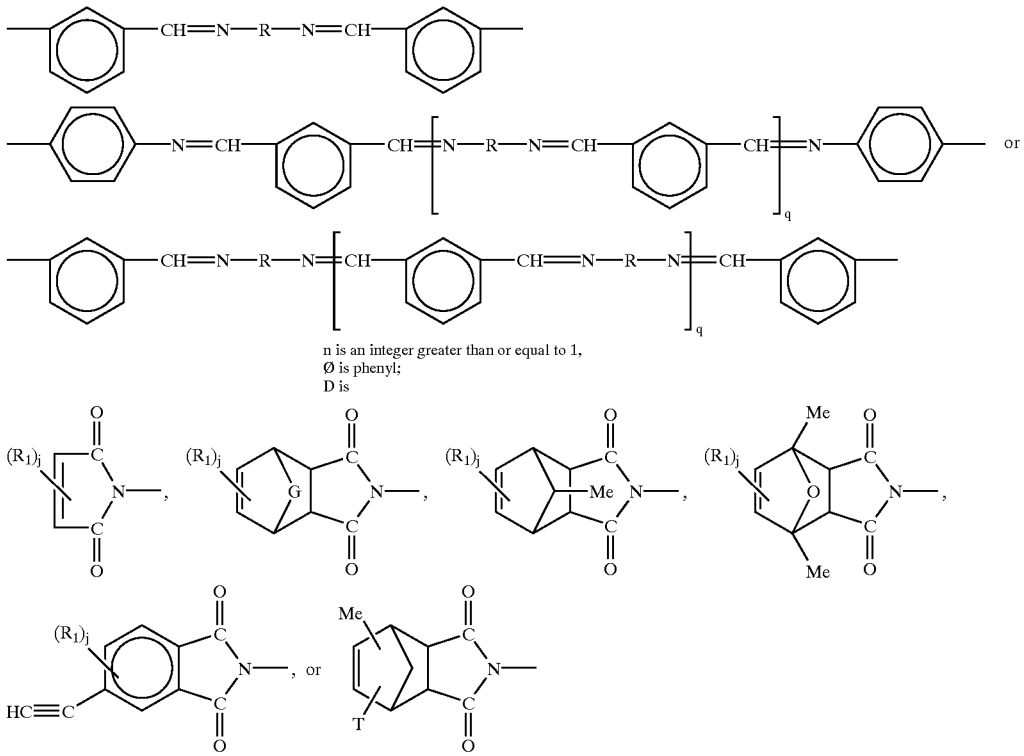

n is an integer greater than or equal to 1,
Ø is phenyl;
D is i is 1 or 2;

R$_1$ is lower alkyl, lower alkoxy, aryl, aryloxy, substituted alkyl, substituted aryl, halogen, or mixtures thereof;
j is 0, 1, or 2;
G is —CH$_2$—, —O—, —S—, or —SO$_2$—;
T is methallyl for allyl;
Me is methyl;
R is phenyl; biphenyl; naphthyl; or a compound of the general formula:

—Ø—W—Ø—

W is —CH$_2$— or —SO$_2$—; and
q is 0–4.

38. The oligomer of claim 37 wherein the diol is:
hydroquinone,
bisphenol A,
p,p'-biphenol,
4,4'-dihydroxydiphenylsulfide,
4,4'-dihydroxydiphenylsulfone,
4,4'-dihydroxydiphenylether,
4,4'-dihydroxydiphenylisopropane,
4,4'-dihydroxydiphenylhexafluoropropane,
HO—Ar—OH,
HO—Ar—L—Ar'—L—Ar—OH,
HO—Ar'—L—Ar—L—Ar'—OH,

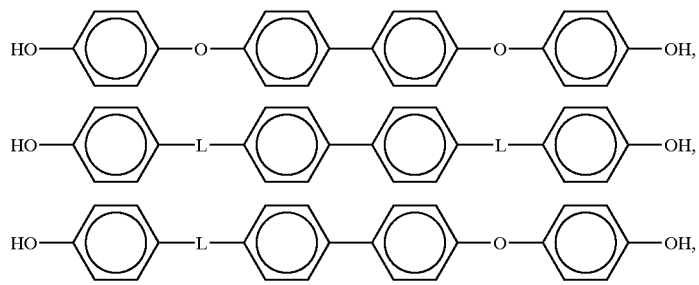

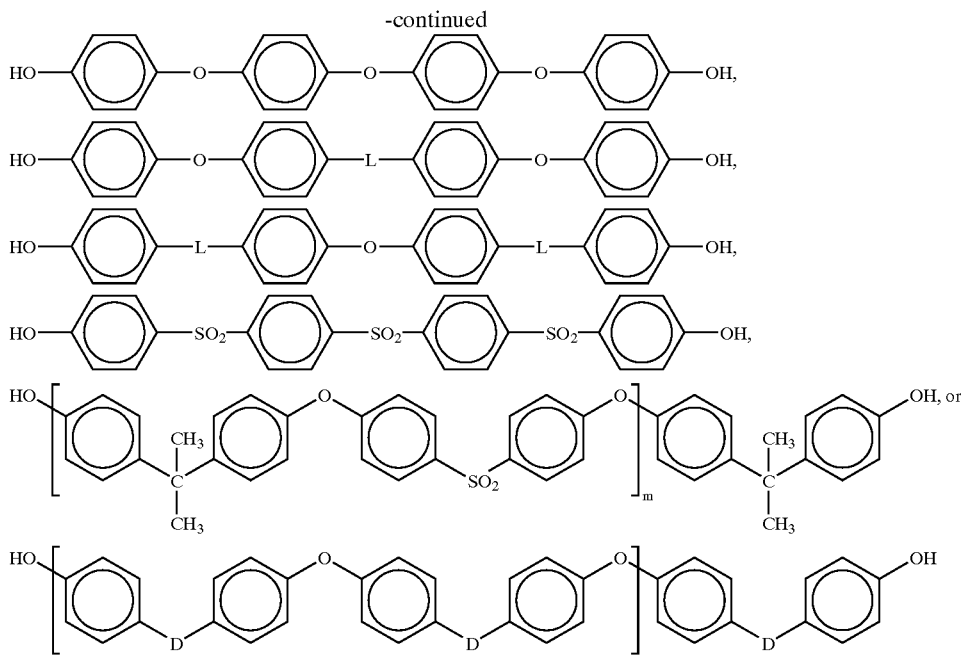

wherein L=—CH$_2$—, —C(CH$_3$)$_2$C—, —(CF$_3$)$_2$C—, —O—, —S—, —SO$_2$—, or —CO—;

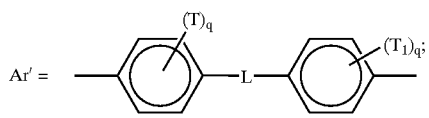

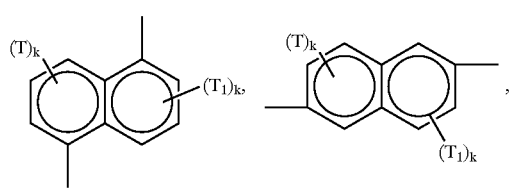

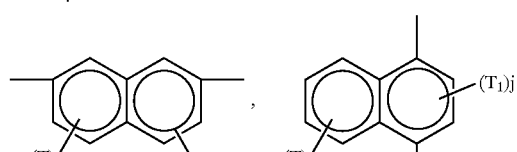

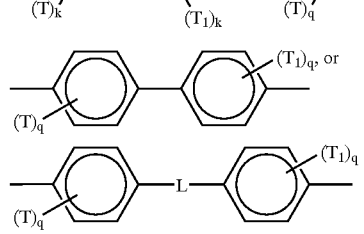

T and T$_1$=lower alkyl, lower alkoxy, aryl, aryloxy, substituted alkyl, substituted aryl, halogen or mixture thereof;

q=0–4;

k 0–3;

j=0, 1, or 2;

Me=methyl;

m=an integer less than or equal to 5; and

D=—CO—, —SO$_2$, —(CF$_3$)$_2$C—, or mixtures thereof.

39. The oligomer of claim 38 wherein the dicarboxylic acid halide includes a radical selected from the group consisting of:

a) phenyl;

(b) naphthyl;

(c) biphenyl;

(d) a polyaryl divalent radical of the general formula:

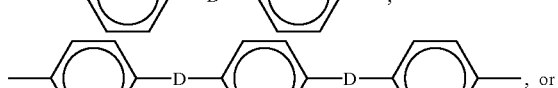

wherein D is —S—, —O—, —CO—, —SO$_2$—, —(CH$_3$)$_2$C—, —(CF$_3$)$_2$C—, or mixtures thereof throughout the chain;

(e) a divalent radical having conductive linkages, illustrated by Schiff base compounds selected from the group consisting of:

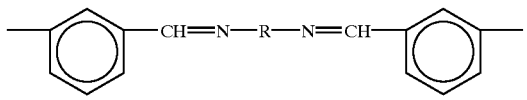

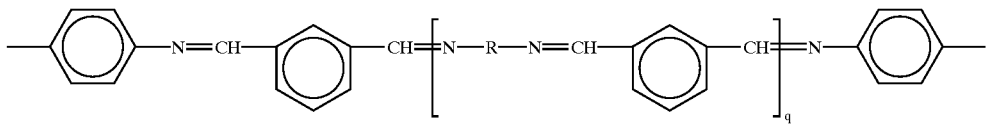

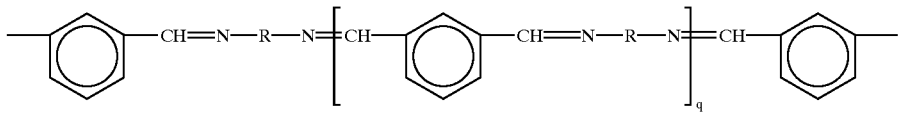

wherein R is phenyl; biphenyl; naphthyl; or a divalent radical of the general formula:

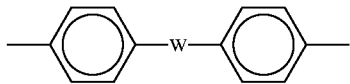

wherein W is —SO$_2$— or —CH$_2$—; and q is 0–4; and
(f) a divalent radical of the general formula:

wherein R$^1$ is a C$_2$ to C$_{12}$ divalent aliphatic alicyclic, or aromatic radical.

40. The oligomer of claim 37 wherein the dicarboxylic acid halide includes a radical selected from the group consisting of:
(a) phenyl;
(b) naphthyl;
(c) biphenyl;
(d) a polyaryl divalent radical of the general formula:

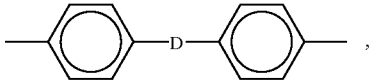

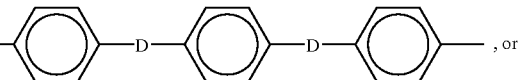

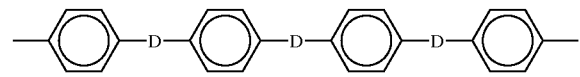

wherein D=—S—, —O—, —CO—, —SO$_2$—, —(CH$_3$)$_2$C—, (CF$_3$)$_2$C—, and mixtures thereof throughout the chain;
(e) a divalent radical having conductive linkages, illustrated by Schiff base compounds selected from the group consisting of:

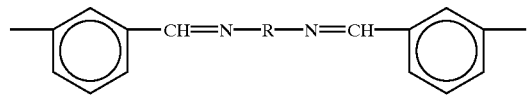

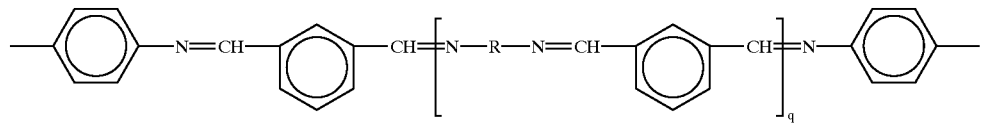

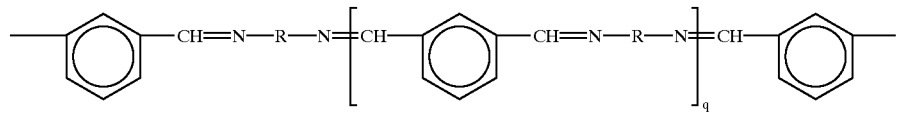

wherein R is selected from the group consisting of: phenyl; biphenyl; naphthyl; or a divalent radical of the general formula:

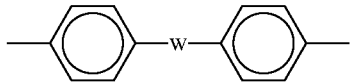

wherein W=—SO$_2$— or —CH$_2$—; and q=0–4; and (f) a divalent radical of the general formula:

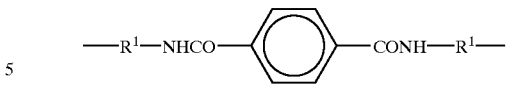

wherein R=a C$_2$ to C$_{12}$ divalent aliphatic, alicyclic, or aromatic radical.

41. A prepreg comprising the oligomer of claim 39 and a reinforcing additive in fiber or particulate form.

42. A prepreg comprising the oligomer of claim 37 and a reinforcing additive in fiber or particulate form.

* * * * *